United States Patent [19]
Asaoka et al.

[11] Patent Number: 6,001,276
[45] Date of Patent: Dec. 14, 1999

[54] LIQUID CRYSTAL DEVICE

[75] Inventors: Masanobu Asaoka, Yokohama; Hideaki Takao, Machida; Koichi Sato, Atsugi; Masahiro Terada, Hadano; Shinichi Nakamura, Isehara; Ikuo Nakazawa, Atsugi, all of Japan

[73] Assignee: Canon Kabishiki Kaisha, Tokyo, Japan

[21] Appl. No.: 08/896,541

[22] Filed: Jul. 18, 1997

[30] Foreign Application Priority Data

Jul. 22, 1996 [JP] Japan .................................. 8-192204

[51] Int. Cl.⁶ .......................... C09K 19/56; C09K 19/52; G02F 1/1337
[52] U.S. Cl. .................................. 252/299.4; 252/299.01; 349/123; 349/124; 349/133; 349/135; 428/1.26
[58] Field of Search ............................ 252/299.01, 299.4, 252/299.61, 299.62, 299.63, 299.6; 428/1.26; 349/122, 123, 124, 133, 184, 135

[56] References Cited

U.S. PATENT DOCUMENTS

| 4,367,924 | 1/1983 | Clark et al. ............................... 350/334 |
| 5,082,587 | 1/1992 | Janulis ................................ 252/299.01 |

(List continued on next page.)

FOREIGN PATENT DOCUMENTS

| 360 521 | 3/1990 | European Pat. Off. . |
| 637 622 | 2/1995 | European Pat. Off. . |
| 647695 | 4/1995 | European Pat. Off. . |
| 755 993 | 1/1997 | European Pat. Off. . |
| 769 542 | 4/1997 | European Pat. Off. . |
| 56-107216 | 1/1983 | Japan . |
| 02142753 | 5/1990 | Japan . |
| WO93/22396 | 11/1993 | WIPO . |
| WO93022396 | 11/1993 | WIPO . |

OTHER PUBLICATIONS

Schadt & Helfrich, "Voltage–dependent optical activity of a twisted nematic liquid crystal", Appl. Phys. Lett. 18(4), Feb. 15, 1971, pp. 127–128.

Clark & Lagerwall, Japan Display '86, Sep. 30–Oct. 2, 1986, pp. 456–458.
Ouchi et al., Japanese Journal of Appl. Phys. 27(5), May 1988, L725–L728.
Chandani et al., Japanese Journal of App. Phys. 27(5), May 1998, L729–L732.
Atsuo Fukuda et al., Structures and Properties of Ferroelectric Liquid Crystals, Corona Publ. Co. Tokyo, Japan, 1990.
Radcliffe et al., 4th Int'l Ferroelectric Liquid Crystal Conference, 1993, p. 46.
Atsuo Fukuda (ed.), Future Liquid Crystal Display and its Materials, 1992.

Primary Examiner—Shean C. Wu
Attorney, Agent, or Firm—Fitzpatrick, Cella, Harper & Scinto

[57] ABSTRACT

A liquid crystal device is constituted by a pair of transparent substrates each having thereon a transparent electrode, and a chiral smectic liquid crystal composition lacking cholesteric phase disposed between the substrates so as to assume at least two optically stable states. At least one of the substrates is provided with an alignment film which comprises a polyimide represented by a recurring unit of formula (I) shown below and has been subjected to a uniaxial aligning treatment.

Formula (I):

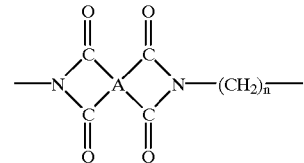

wherein A denotes a tetravalent aliphatic hydrocarbon group free from a planar structure or a tetravalent alicyclic hydrocarbon group, and n is an integer of at least 1. The chiral smectic liquid crystal composition may preferably contain at least one species of fluorine-containing mesomorphic compound comprising a fluorocarbon terminal portion and a hydrocarbon terminal portion connected with a central core and having a smectic phase or a latent smectic phase.

38 Claims, 7 Drawing Sheets

U.S. PATENT DOCUMENTS

| | | | |
|---|---|---|---|
| 5,129,727 | 7/1992 | Hanyu et al. | 359/75 |
| 5,192,596 | 3/1993 | Hanyu et al. | 428/1 |
| 5,250,330 | 10/1993 | Asaoka et al. | 428/1 |
| 5,262,082 | 11/1993 | Janulis et al. | 252/299.01 |
| 5,320,883 | 6/1994 | Asaoka et al. | 428/1 |
| 5,325,219 | 6/1994 | Hanyu et al. | 359/78 |
| 5,326,600 | 7/1994 | Asaoka et al. | 428/1 |
| 5,419,932 | 5/1995 | Togano et al. | 428/1 |
| 5,464,668 | 11/1995 | Asaoka et al. | 428/1 |
| 5,510,159 | 4/1996 | Asaoka et al. | 428/1 |
| 5,552,193 | 9/1996 | Asaoka et al. | 428/1 |
| 5,568,295 | 10/1996 | Nakamura et al. | 349/124 |
| 5,576,864 | 11/1996 | Takao et al. | 359/76 |
| 5,587,211 | 12/1996 | Togano et al. | 428/1 |
| 5,626,925 | 5/1997 | Asaoka et al. | 428/1 |
| 5,666,217 | 9/1997 | Kaneko et al. | 349/122 |

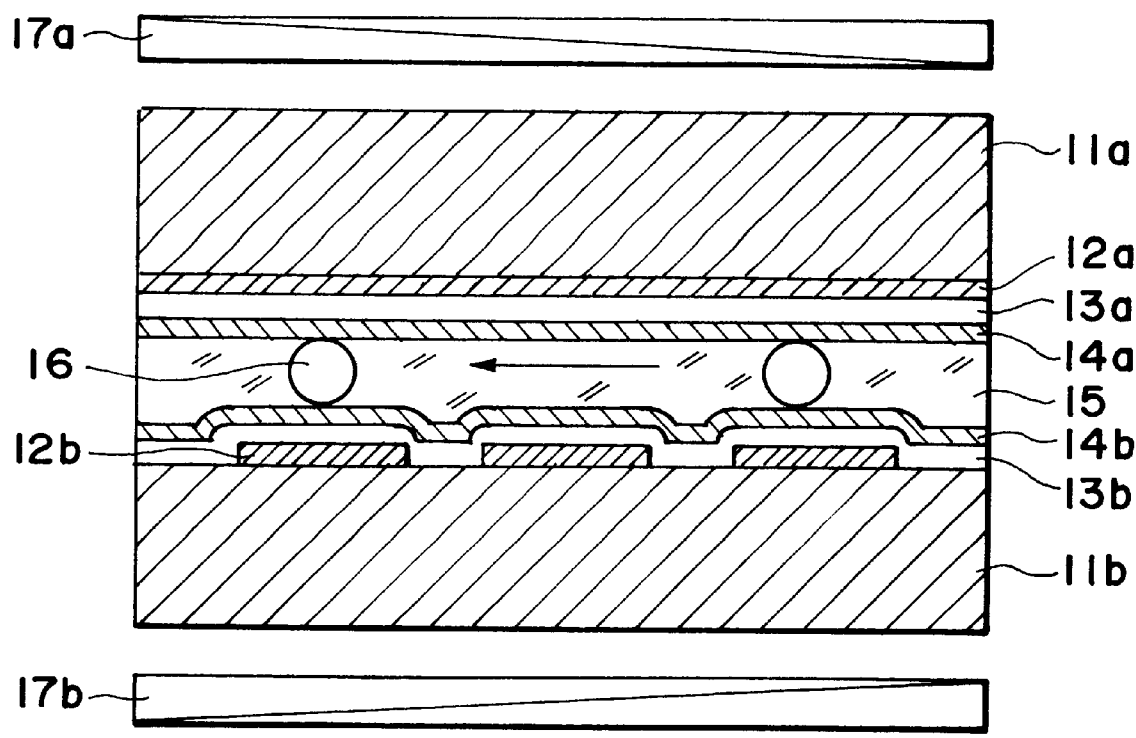
F I G. 1

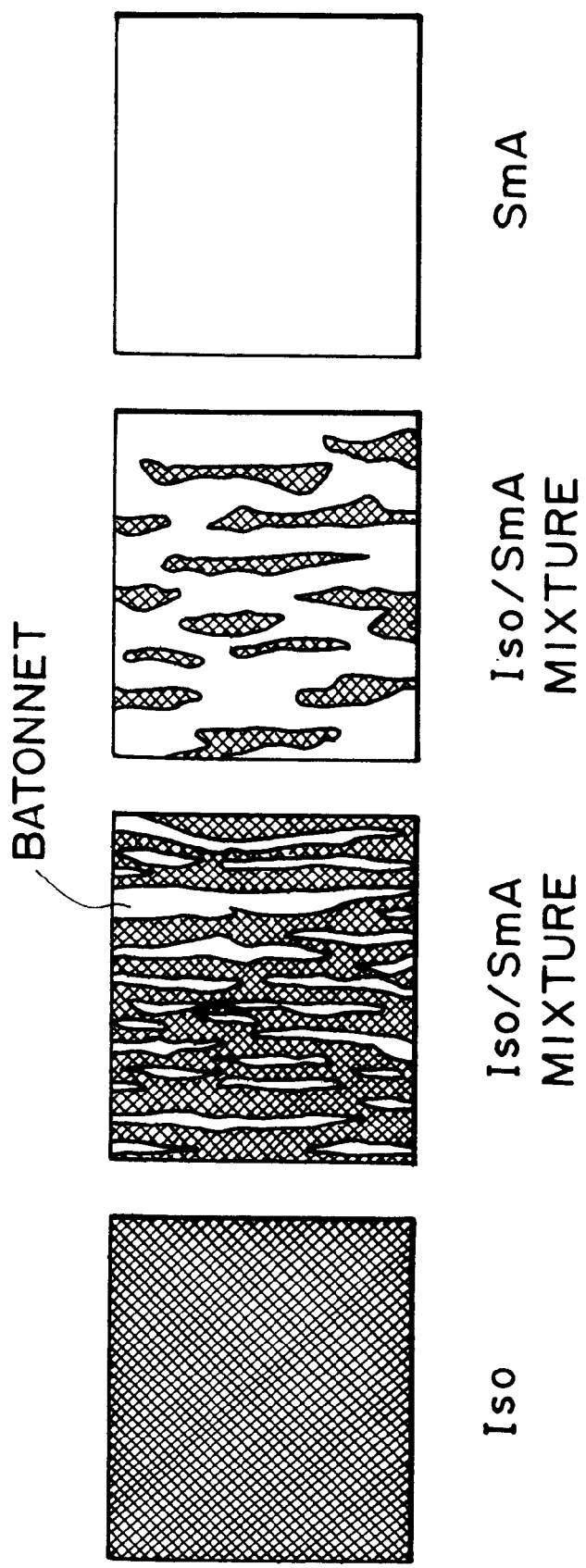

FIG. 6AA
FIG. 6AB
FIG. 6A
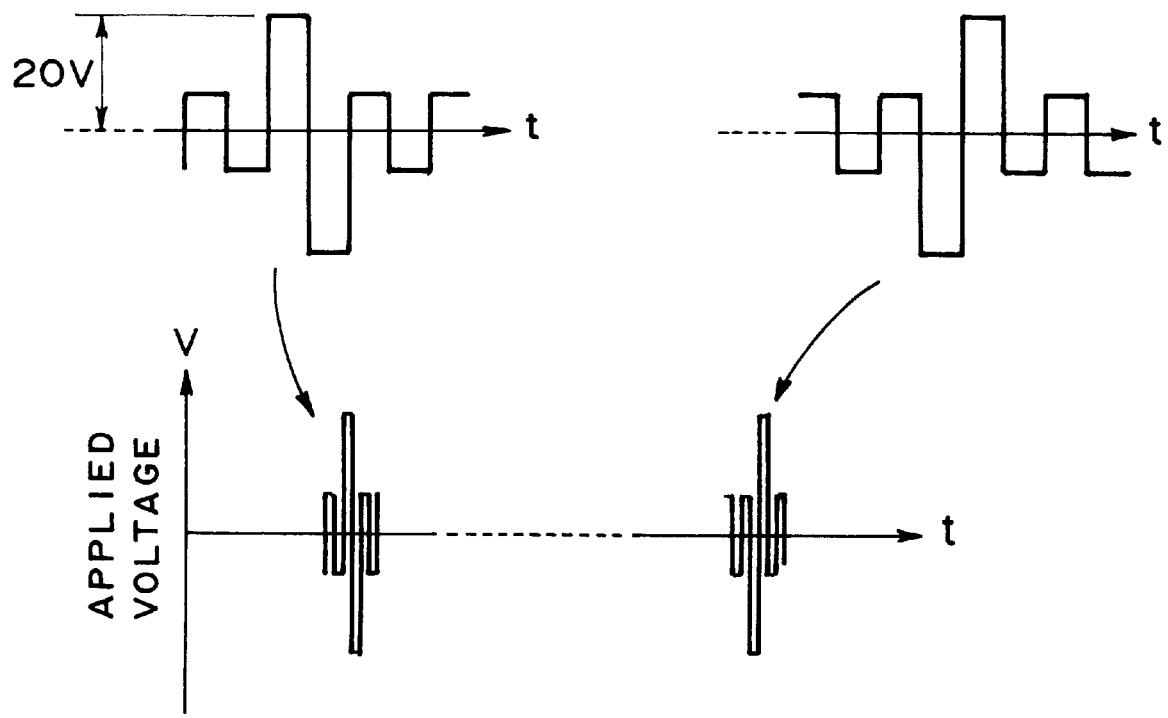
FIG. 6B
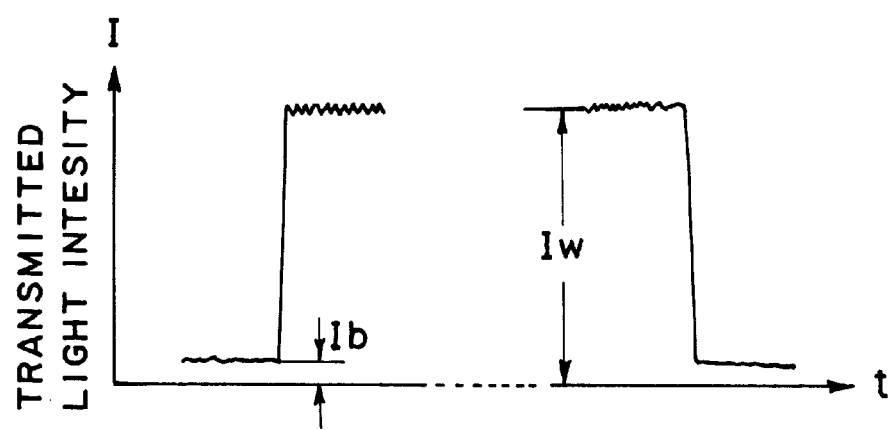

LIQUID CRYSTAL DEVICE

FIELD OF THE INVENTION AND RELATED ART

The present invention relates to a liquid crystal device using a chiral smectic liquid crystal composition for use in computer terminal displays, various flat panel displays for word processors, type writers and television receivers, video camera view finders, light valves for projectors, light valves for liquid crystal printers, etc.

The most popular and extensively used display may be CRTs (cathode ray tubes) which have been widely used for displaying motion pictures of television and video tape recorders or as monitor displays for personal computers. Based on the operation characteristic, the CRT is accompanied with difficulties such that the recognizability of a static image is lowered due to flickering and scanning fringes caused by an insufficient resolution, and the fluorescent member is deteriorated due to burning. Further, it has been recently found that electromagnetic wave emitted from CRTs can adversely affect human bodies and health of VDT operators. Further, the CRT structurally has a large rearward space behind the display surface, so that the space economization in offices and at home may be obstructed thereby.

As a type of device solving such problems of the CRT, there has been known a liquid crystal device, including a type using a twisted nematic (TN) liquid crystal as disclosed by M. Schadt and w. Helfrich, "Applied Physics Letters", Vol. 18, No. 4 (Feb. 17, 1971), pp. 127–128.

The liquid crystal device using a TN-liquid crystal includes a simple matrix-type liquid crystal device which is advantageous from a viewpoint of production cost. This type of liquid crystal device is however accompanied with a problem that it is liable to cause crosstalk when driven in a multiplex manner by using an electrode matrix of a high pixel density, and therefore the number of pixels is restricted.

In contrast with such a simple matrix-type liquid crystal device, a TFT-type liquid crystal device has been developed in recent years, wherein each pixel is provided with and driven with a TFT (thin film transistor). As a result, the problems of crosstalk and response speed can be solved but, on the other hand, a larger area device of the type poses an extreme difficulty in industrial production thereof without inferior pixels. Further even if such production is possible, the production cost can be increased enormously.

For providing improvements to the above-mentioned difficulties of the conventional types of liquid crystal devices, a liquid crystal device of the type which controls transmission of light in combination with a polarizing device by utilizing a refractive index anisotropy of chiral smectic liquid crystal molecules, has been proposed by Clark and Lagerwall (Japanese Laid-Open Patent Application (JP-A) 56-107216, U.S. Pat. No. 4,367,924). The chiral smectic liquid crystal generally has chiral smectic C phase (SmC*) or H phase (SmH*) in a specific temperature range and, in the phase, shows a property of assuming either one of a first optically stable state and a second optically stable state in response to an electric field applied thereto and maintaining such a state in the absence of an electric field, namely bistability, and also have a very quick response speed because it causes inversion switching based on its spontaneous polarization. Thus, the chiral smectic liquid crystal develops bistable states showing a memory characteristic and further has an excellent viewing angle characteristic. Accordingly, the chiral smectic liquid crystal is considered to be suitable for constituting a display device or a light valve of a high speed, a high resolution and a large area. Further, an anti-ferroelectric liquid crystal device using a chiral smectic liquid crystal showing three stable states has been proposed recently by Chandani, Takezoe, et al (Japanese Journal of Applied Physics, Vol. 27 (1988), p.p. L729–L732).

Such a chiral smectic liquid crystal is accompanied with problems, such as the occurrence of zigzag-shaped alignment defects and twisting of liquid crystal molecules between a pair of substrates (called "splay alignment") leading to a lowering in contrast (as described in, e.g., "Structures and Properties of Ferroelectric Liquid Crystals" authored by Atsuo Fukuda and Hideo Takezoe; Corona Sha Publishing Co., Ltd. (1990)). The defects are considered to be attributable to a layer structure of a chiral smectic liquid crystal including two types of chevron structures between a pair of substrates.

A known method of solving the above problem is to provide the liquid crystal molecules with a pretilt angle, thereby uniformizing the chevron layer structure in one direction so that the twisting state (splay alignment state) of liquid crystal molecules between the pair of substrate is made more unstable than a uniform alignment state in respect of elastic energy.

Another method is to form a liquid crystal layer structure not of the bent chevron structure but of a bookshelf structure wherein smectic layers are little inclined but aligned generally in parallel or a structure close thereto, thereby removing the zigzag defects and realizing the uniform alignment to provide a high contrast (as disclosed in, e.g., "Future Liquid Crystal Display and Its Materials", edited by Atsuo Fukuda; K. K. C. M. C., (1992)). In a method of realizing a bookshelf layer structure, a naphthalene-based liquid crystal material is used. In this case, however, the resultant tilt angle is on the order of 10 deg. and is much smaller than 22.5 deg. which theoretically provides a maximum transmittance, so that the device can exhibit only a low transmittance. Another method is to apply an external electric field to a liquid crystal device containing a liquid crystal in a chevron structure to induce a bookshelf structure, but the resultant structure is rather unstable against an external stimulation, such as a temperature fluctuation.

As a liquid crystal material providing a bookshelf structure or a structure close thereto, a mesomorphic compound having a perfluoroalkyl ether terminal chain (U.S. Pat. No. 5,262,082), a liquid crystal composition containing such a mesomorphic compound (Marc D. Raddiffe et al., The 4th International Ferroelectric Liquid Crystal Conference, p-46 (1993)), etc., have been proposed. By using such a liquid crystal material, it is possible to provide a bookshelf structure or a similar structure having a small layer inclination angle with an optimum tilt angle without using an external field, such as an electric field.

However, such a liquid crystal material does not generally assume cholesteric phase. As a result, when a liquid crystal device is formed by disposing such a liquid crystal material between a pair of substrates at least one of which has thereon an alignment control layer subjected to a prescribed uniaxial aligning treatment, the liquid crystal alignment state cannot be sufficiently controlled, thus being liable to fail in providing a good alignment state.

SUMMARY OF THE INVENTION

In view of the above-mentioned circumstances, a principal object of the present invention is to provide a liquid crystal device, particularly a chiral smectic liquid crystal device, containing a stable liquid crystal layer having a bookshelf structure or a structure close thereto having a small layer inclination and assuming a stable alignment state, thereby to exhibit excellent performances, inclusive of a high contrast, a quick response speed, a high resolution and a high brightness and a large display area.

Another object of the present invention is to provide a display apparatus including such a liquid crystal device showing excellent display characteristics including a high contrast, a high resolution and a high brightness, and having a large display area.

According to the present invention, there is provided a liquid crystal device, comprising: a pair of substrates each having thereon a transparent electrode, and a chiral smectic liquid crystal composition lacking cholesteric phase disposed between the substrates so as to assume at least two optically stable states, wherein at least one of the substrates is provided with an alignment film which comprises a polyimide represented by a recurring unit of formula (I) shown below and has been subjected to a uniaxial aligning treatment, and the chiral smectic liquid crystal composition has a layer spacing-changing characteristic providing a layer spacing $d_A$ at a first transition point where the layer spacing of the liquid crystal composition begins to abruptly decrease or decrease at a discontinuously larger decrease rate on temperature decrease in vicinity of a transition temperature from smectic A phase to chiral smectic C phase and a layer spacing $d_{min}$ at a second transition point where the layer spacing of the liquid crystal composition begins to increase on further temperature decrease from the first transition point, wherein $0.990 \leq d_{min}/d_A$, Formula (I):

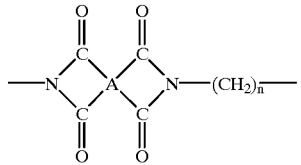

wherein A denotes a tetravalent aliphatic hydrocarbon group or a tetravalent alicyclic hydrocarbon group, n is an integer of at least 1, and the treatment group A has no planar structure.

The chiral smectic liquid crystal composition may preferably contain at least one species of fluorine-containing mesomorphic compound comprising a fluorocarbon terminal portion and a hydrocarbon terminal portion connected with a central core and having a smectic phase or a latent smectic phase.

In another preferred embodiment, the above-mentioned pair of substrates includes one having an alignment film comprising the above-mentioned polyimide represented by the recurring unit of the formula (I) and subjected to a uniaxial aligning treatment, and the other having an alignment film not subjected to a uniaxial aligning treatment.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a schematic sectional view of an embodiment of the liquid crystal device using a chiral smectic liquid crystal composition according to the present invention.

FIGS. 3A–3D are schematic illustrations of states of phase transition of Iso (isotropic) phase to SmA (smectic A) phase of a liquid crystal material lacking Ch (cholesteric) phase.

FIG. 6A is a waveform diagram showing two types of applied voltage waveform used in Examples appearing hereinafter; FIG. 6B is an illustration of resultant transmitted light intensities through the device; and FIGS. 6AA and 6AB are enlarged illustrations of the two types of applied voltage waveforms shown in FIG. 6A.

DESCRIPTION OF THE PREFERRED EMBODIMENTS

Figures 2A, 2B, 2C, 2D:
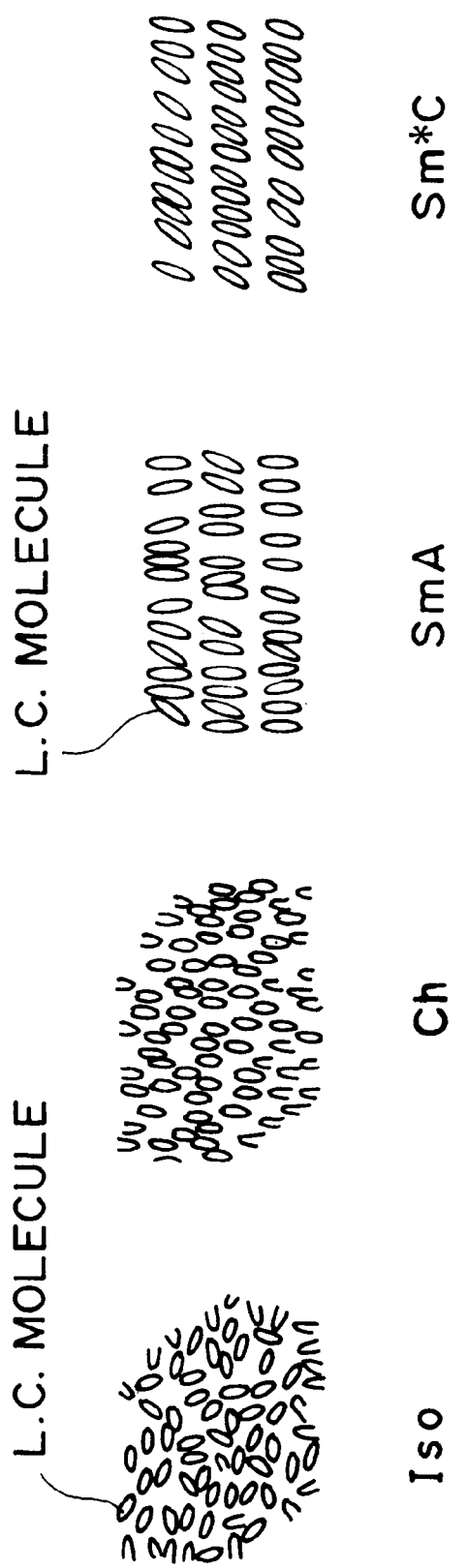
FIGS. 2A–2D are schematic illustrations of liquid crystal molecular alignment states in respective liquid crystal phases.

A chiral smectic liquid crystal disposed between a pair of oppositely disposed substrates may develop bistability in its Sm* phase (chiral smectic phase, typically SmC* (chiral smectic C) phase), which is formed by gradual cooling from its liquid phase (isotropic phase). Accordingly, the alignment state in chiral smectic phase is greatly affected by a phase transition series between the isotropic phase and the chiral smectic phase. In view of the thermodynamic stability, the phase transition series may include the following four types:

(1) Iso-Ch(N*)-SmA-SmC*,
(2) Iso——SmA-SmC*,
(3) Iso-Ch(N*)——SmC*, and
(4) Iso——SmC*, wherein Iso denotes isotropic phase; Ch(N*), cholesteric (i.e., chiral nematic) phase; and SmA, smectic A phase. The liquid crystal alignment states in the respective phases are schematically illustrated in FIGS. 2A–2D. In the case of a liquid crystal material having the phase transition series (1), a liquid crystal molecule long axis order is determined at Iso-Ch transition, a liquid crystal molecule positional order (layer structure) is determined at Ch-SmA transition, and a liquid crystal molecule tilt is developed at SmA-SmC* transition, so that a uniform alignment can be easily obtained because of such a sequential order determination. In contrast thereto, in the cases of liquid crystal materials having the phase transition series (2), (3) and (4), it becomes difficult to realize a uniform alignment because plural orders have to be determined simultaneously, i.e., simultaneous determination of molecular long axis order and layer structure for (2); simultaneous determination of layer structure and tilting of liquid crystal molecules for (3); and simultaneous determination of molecular long-axis order, layer structure and tilting for (4). The present invention aims at realization of uniform alignment of a liquid crystal material (composition) having the phase transition series (2) which is suitable for providing a bookshelf structure or a structure close thereto.

FIGS. 3A–3D are sketches of polarizing microscopic observation by us of stages of Iso-SmA phase transition. According to our observation during the transition from isotropic (Iso) phase to smectic A (SmA) phase, islands of SmA (hereinafter called "batonnets") having an almost spheroidal shape are first generated and are joined together to complete the phase transition. Further, it is also observed that alignment defects occur in a liquid crystal (particularly in a liquid crystal cell) when the batonnets grow in random directions or due to joint failure between batonnets.

The mechanism for occurrence of such alignment defects has not been fully clarified as yet, but it has been found possible to provide a defect-free, uniform and good alignment state by disposing a liquid crystal composition having the above-mentioned phase transition series (2) and liable to cause alignment defects as described above between a pair of substrates, at least one of which is provided with an alignment film comprising a polyimide having a recurring unit of the above-mentioned formula (I) and subjected to a uniaxial aligning treatment, such as rubbing. This may be attributable to factors such that the polyimide having the recurring unit of the formula (I) can be readily stretched during a uniaxial aligning treatment and causes a large electron density anisotropy in the layer after the aligning treatment to exert a strong alignment control force to the liquid crystal having the above-mentioned phase transition series (2).

Hereinbelow, a cell structure of a preferred embodiment of the liquid crystal device according to the present invention according to the present invention will be described with reference to FIG. 1.

Referring to FIG. 1, the liquid crystal device includes a pair of glass substrates 11a and 11b having thereon transparent electrodes 12a and 12b, respectively, of tin oxide, indium oxide, indium tin oxide (ITO), etc., and further insulating films 13a and 13b, respectively, functioning as a short circuit prevention layer of ZnO, ZrO, $TaO_x$, etc. The substrate 11a is further provided with an alignment film (alignment control layer) 14a of a polyimide subjected to a uniaxial aligning treatment, such as rubbing in a direction of the indicated arrow. The substrate 11b is provided with an alignment film 14b of silane coupling agent, polyimide, polysiloxane, etc., not subjected to a uniaxial aligning treatment. The substrates 11a and 11b are disposed opposite to each other with spacer beads 16 of, e.g., silica or alumina and sealed at periphery thereof with a sealant (not shown) to leave a space therebetween, which is filled with a chiral liquid crystal composition 15 according to the present invention as described above. The thus-formed cell structure is sandwiched between a pair of polarizers 17a and 17b to form a liquid crystal device. FIG. 1 shows an embodiment of an asymmetrical cell structure, but the alignment film of the present invention can also be used to provide a symmetrical cell structure.

In the liquid crystal device of the above-descried structure, the transparent electrodes 12a and 12b may be connected to a signal power supply (not shown) so as to effect switching depending on switching signals from the signal power supply. The liquid crystal device may function as a light valve of a display device, etc. Further, if transparent electrodes 12a and 12b are provided respectively in pluralities so as to form a cross matrix electrode structure, a pattern display or exposure becomes possible to provide displays for a personal computer, a wordprocessor, etc., or a light valve for a printer, etc.

In the liquid crystal device of the above-mentioned structure, the alignment control layer 14a may comprise a uniaxially aligning-treated film, preferably a rubbed film, of a polyimide which has been formed by application of a polyamic acid and baking thereof, because of easy preparation and high alignment control power.

Specific examples of the polyimide having the recurring unit of the general formula (I) may include polyimides as represented by recurring units shown below:

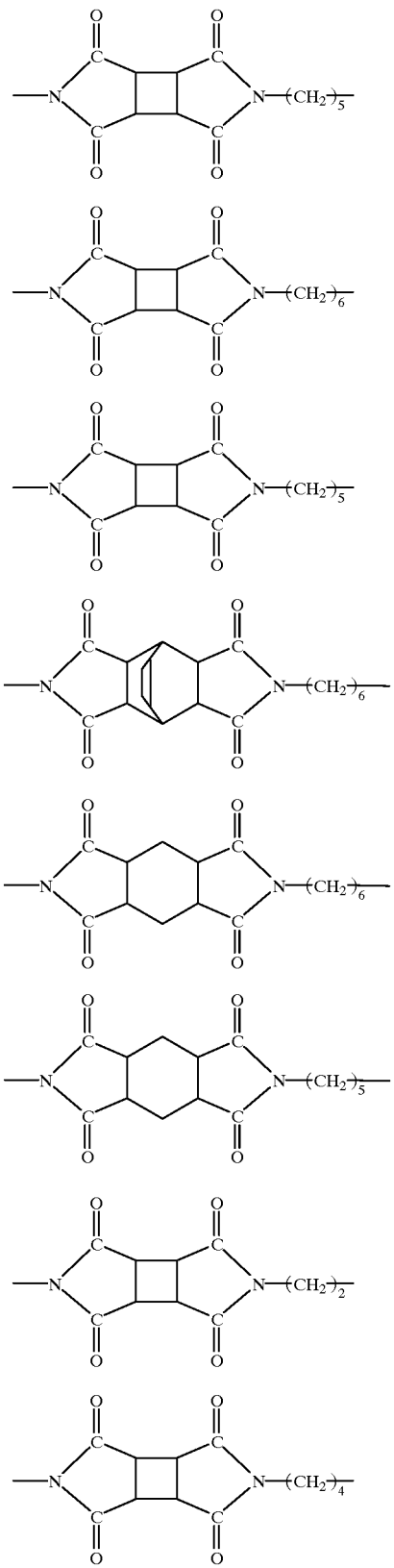

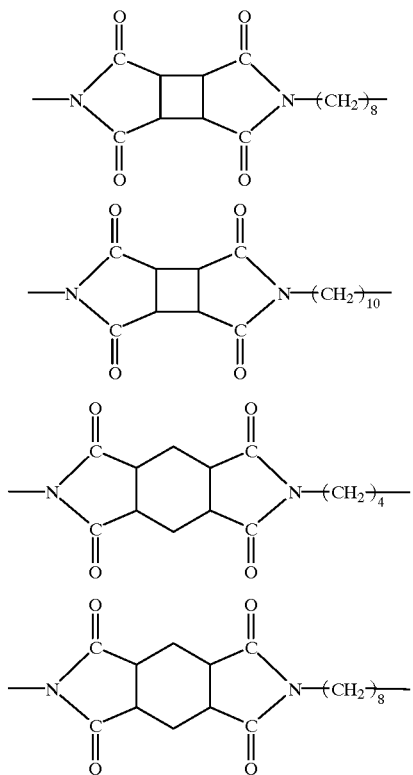

The polyimide having the recurring unit of the formula (I) may preferably have a tetravalent alicyclic group A shown below.

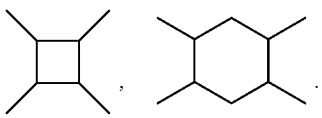

Further, such a tetravalent alicyclic group A may desirably be excellent in symmetry in view of a uniaxial alignment characteristic-imparting performance. Examples of such a group A may include those in trans form as shown below.

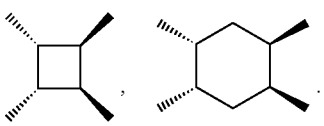

In view of a good solubility in a solvent and applicability onto a substrate, the group A may preferably be

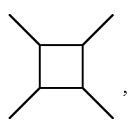

particularly

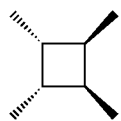

(trans form).

It is further preferred to use a polyimide having a recurring unit of the formula (I) wherein n is an even number of 2–10 so as to attain a good alignment characteristic.

The above mentioned polyimides may be used singly or in combination with two or more species.

The above alignment film used in the present invention also effective in alignment of an anti-ferroelectric chiral smectic liquid crystal having three stable states as mentioned above, thus providing an excellent alignment state.

Generally, in a liquid crystal device utilizing switching between two stable states of a ferroelectric liquid crystal showing a memory characteristic, there can occur a phenomenon such that a threshold characteristic of the device is changed after the device is left standing or driven in one stable state (maintained state) for a long time (hereinbelow, referred to as "monostabilization phenomenon) accelerates a stabilization of liquid crystal molecules in one of the stable states (in a maintained state), so that a threshold value for switching from one stable state (maintained state) to the other stable state (unmaintained state) is increased and on the other hand, a threshold value for switching from the unmaintained state to the maintained state is decreased.

The monostabilization phenomenon may presumably be caused due to a charge trap, e.g., a trap of ions, within the alignment film or at a boundary between the alignment film and a liquid crystal layer or due to alleviation or adsorption of alignment film molecules or liquid crystal molecules toward the maintained state while being changed in a state close to a bulk state.

The charge trap within the alignment film may be considered that it is not readily caused in the case of an alignment film of an aliphatic hydrocarbon or alicyclic-type where an electron density is not localized in view of its molecular structure when compared with an alignment film of an aromatic ring-type having a larger $\pi$ electron density. Accordingly, the above-described alignment film used in the present invention employing an aliphatic or alicyclic hydrocarbon group in its molecular structure may be considered to be a film per se not readily causing (electric) polarization and a charge trap, thus effectively suppressing the monostabilization phenomenon as described above.

The chiral smectic liquid crystal composition used in the present invention may desirably contain at least one species of a fluorine-containing mesomorphic compound which preferably has a structure including a fluorocarbon terminal portion and a hydrocarbon terminal portion connected by a central core and has smectic phase or latent smectic phase. The term "latent smectic phase" refers to a property of a compound concerned that the compound alone does not exhibit smectic phase but can be a component compatibly contained in smectic phase of a liquid crystal composition.

In a preferred class of the fluorine-containing mesomorphic compound, the fluorocarbon terminal portion may preferably be:

a group represented by the formula $-D^1-C_{xa}F_{2xa}-X$, where xa is 1–20; X is $-H$ or $-F$; $-D^1-$ is $-CO-O-(CH_2)_{ra}-$, $-O-(CH_2)_{ra}-$, $-(CH_2)_{ra}-$, $-O-SO_2-$, $-SO_2-$, $-SO_2-(CH_2)_{ra}-$, $-O-$ $(CH_2)_{ra}$—O—$(CH_2)_{rb}$—, —$(CH_2)_{ra}$—N($C_{pa}H_{2pa+1}$)—$SO_2$— or —$(CH_2)_{ra}$—N($C_{pa}H_{2pa+1}$)—CO—; where ra and rb are independently 1–20; and pa is 0–4; or a group represented by —$D^2$—$(C_{xb}F_{2xb}$—O)$_{za}$—$C_{ya}F_{2ya+1}$, wherein xb is 1–10 independently for each ($C_{zb}F_{2xb}$—O); ya is 1–10; za is 1–10; —$D^2$— is —CO—O—$C_{rc}H_{2rc}$, —O—$C_{rc}H_{2rc}$— —$C_{rc}H_{2rc}$—, —O—($C_{sa}H_{2sa}$—O)$_{ta}$—$C_{rd}H_{2rd}$—, —O—$SO_2$—, —$SO_2$—, —$SO_2$—$C_{rc}H_{2rc}$—, —$C_{rc}H_{2rc}$—N($C_{pb}H_{2pb+1}$)—$SO_2$—, —$C_{rc}H_{2rc}$—N($c_{pb}H_{2pb+1}$)—CO—, or a covalent bond, where rc and rd are independently 1–20; sa is independently 1–10 for each ($C_{sa}H_{2sa}$—O); ta is 1–6; and pb is 0–4.

In the fluorine-containing mesomorphic compound, a central core may preferably comprises at least two rings independently selected from aromatic, heteroaromatic, cycloaliphatic, or substituted aromatic, heteroaromatic, or cycloaliphatic rings, which may be connected one with another by a covalent bond or by functional groups selected from —COO—, —COS—, —HC=N—, —COSe—. Rings may be fused or non-fused. Heteroatoms within the heteroaromatic ring comprise at least one atom selected from N, O or S. Non-adjacent methylene groups in cycloaliphatic rings may be substituted by O or S atom.

It is particularly preferred to use a fluorine-containing mesomorphic compound of the following general formula (II) or general formula (III):

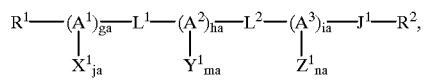

wherein $A^1$, $A^2$ and $A^3$ are each independently

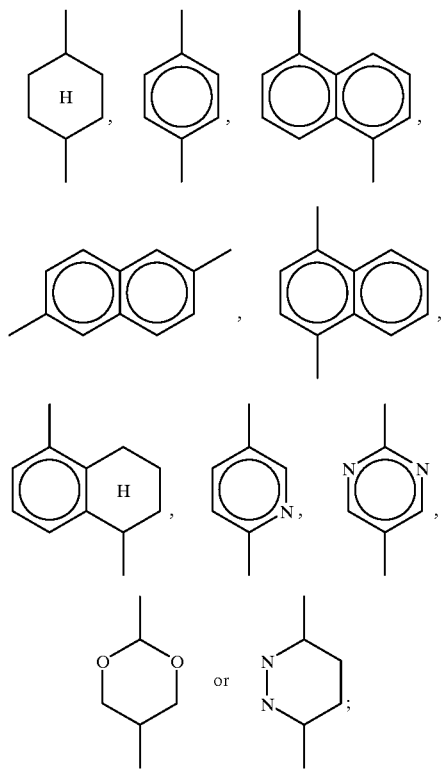

ga, ha and ia are independently an integer of 0–3 with the proviso that the sum of ga+ha+ia be at least 2;

$L^1$ and $L^2$ are each independently a covalent bond, —CO—O—, —O—CO—, —COS—, —S—CO—, —CO—Se—, —Se—CO—, —CO—Te—, —Te—CO—, —$CH_2CH_2$—, —CH=CH—, —C≡C—, —CH=N—, —N=CH—, —$CH_2$—O—, —O—$CH_2$—, —CO— or —O—;

$X^1$, $Y^1$ and $Z^1$ are each a substituent of $A^1$, $A^2$ and $A^3$, respectively, and each $X^1$, $Y^1$ and $Z^1$ are independently —H, —Cl, —F, —Br, —I, —OH, —$OCH_3$, —$CH_3$, —CN or —$NO_2$;

each ja, ma and na are independently an integer of 0–4;

$J^1$ is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—N($C_{pa}H_{2pa+1}$)—$SO_2$— or —$(CH_2)_{ra}$—N($C_{pa}H_{2pa+1}$)—CO—; where ra and rb are independently 1–20, and pa is 0–4;

$R^1$ is —O—$C_{qa}H_{2qa}$—O—$C_{qb}H_{2qb+1}$, —$C_{qa}H_{2qa}$—O—$C_{qb}H_{2qb+1}$, —$C_{qa}H_{2qa}$—$R^3$, —O—$C_{qa}H_{2qa}$—$R^3$, —CO—O—$C_{qa}H_{2qa}$—$R^3$, or —O—CO—$C_{qa}H_{2qa}$—$R^3$ which may be either straight chain or branched; where $R^3$ is —O—CO—$C_{qb}H_{2qb+1}$, —CO—O—$C_{qb}H_{2qb+1}$, —H, —Cl, —F, —$CF_3$, —$NO_2$ or —CN; and qa and qb are independently 1–20;

$R^2$ is $C_{xa}F_{2xa}$—X, where X is —H or —F, xa is an integer of 1–20.

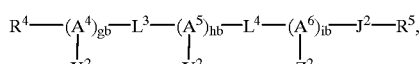

wherein $A^4$, $A^5$ and $A^6$ are each independently

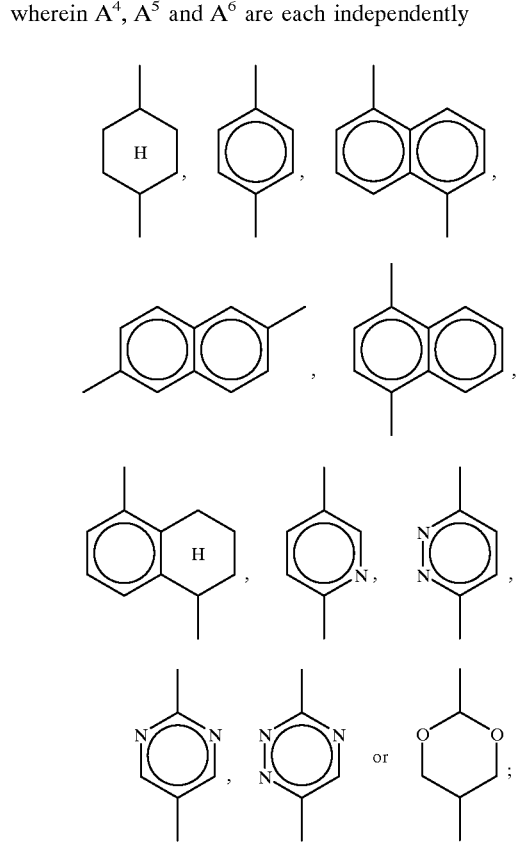

gb, hb and ib are each independently an integer of 0–3 with the proviso that the sum of gb+hb+ib be at least 2;

each $L^3$ and $L4$ are independently a covalent bond, —CO—O—, —O—CO—, —CO—S—, —S—CO—, —CO—Se—, —Se—CO—, —CO—Te—, —Te—CO—, —(CH$_2$CH$_2$)$_{ka}$— (ka is 1–4), —CH=CH—, —C≡C—, —CH=N—, —N=CH—, —CH$_2$—O—, —O—CH$_2$—, —CO— or —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

$J^2$ is —CO—O—CrcH$_{2rc}$—, —O—C$_{rc}$H$_{2rc}$—, —C$_{rc}$H$_{2rc}$—, —O(C$_{sa}$H$_{2sa}$—O)$_{ta}$—C$_{rd}$H$_{2rd}$—, —O—SO$_2$—, —SO$_2$—, —SO$_2$—C$_{rc}$H$_{2rc}$—, —C$_{rc}$H$_{2rc}$—N(C$_{pb}$H$_{2pb+1}$)—SO$_2$— or —C$_{rc}$H$_{2rc}$—N(C$_{pb}$H$_{2pb+1}$)—CO—; rc and rd are independently 1–20;

sa is independently 1–10 for each (C$_{sa}$H$_{2sa}$—O), ta is 1–6; pb is 0–4;

$R^4$ is O—(C$_{qc}$H$_{2qc}$—O)$_{wa}$—C$_{qd}$H$_{2qd+1}$, —(C$_{qc}$H$_{2qc}$—O)$_{wa}$—C$_{qd}$H$_{2qd+1}$, —C$_{qc}$H$_{2qc}$—R$^6$, —O—C$_{qc}$H$_{2qc}$R$^6$, —CO—O—C$_{qc}$H$_{2qc}$—R$^6$, or O—CO—C$_{qc}$H$_{2qc}$—R$^6$ which may be either straight chain or branched; $R^6$ is —O—CO—C$_{qd}$H$_{2qd+1}$; —CO—O—C$_{qd}$H$_{2qd+1}$, —Cl, —F, —CF$_3$, —NO$_2$, —CN or —H; qc and qd are independently an integer of 1–20; wa is an integer of 1–10;

$R^5$ is (C$_{xb}$F$_{2xb}$—O)$_{za}$—C$_{ya}$F$_{2ya+1}$, wherein xb is independently 1–10 for each (C$_{xb}$F$_{2xb}$—O); ya is 1–10; and za is 1–10.

The compounds represented by the general formula (II) may be obtained through a process described in U.S. Pat. No. 5,082,587 (corr. to JP-A 2-142753). Specific examples thereof are enumerated below.

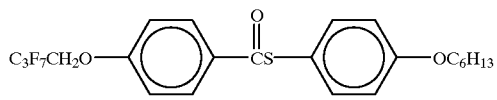

II-1

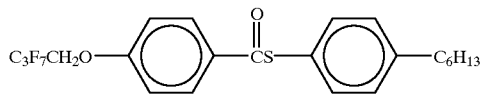

II-2

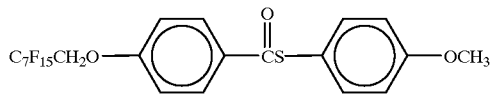

II-3

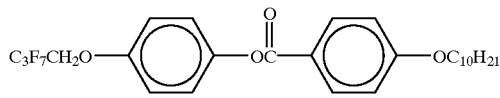

II-4

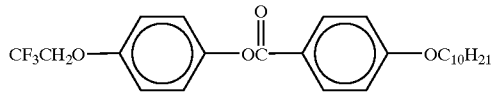

II-5

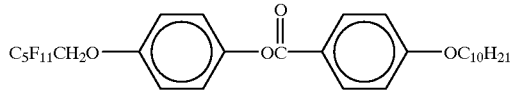

II-6

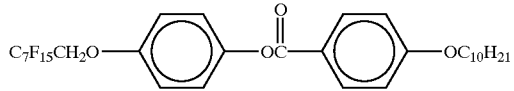

II-7

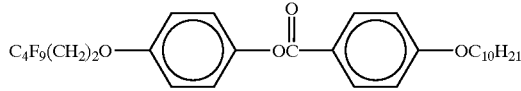

II-8

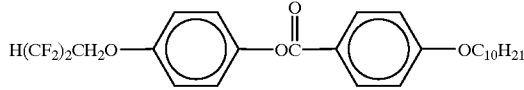

II-9

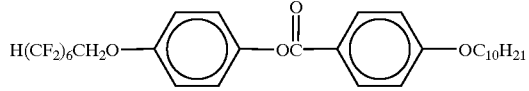

II-10

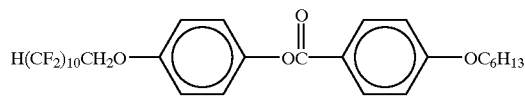
II-11
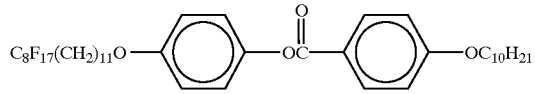
II-12
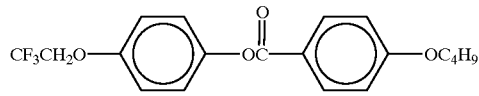
II-13
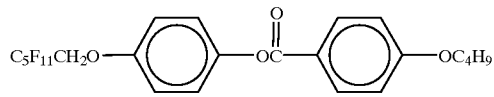
II-14
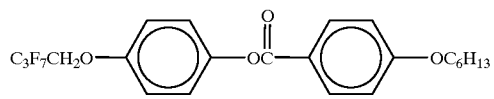
II-15
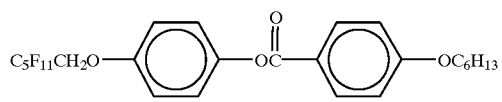
II-16
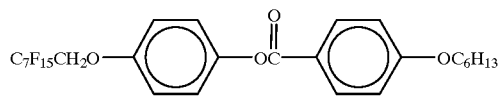
II-17
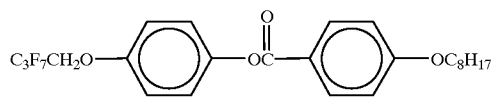
II-18
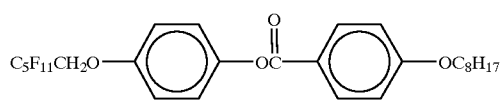
II-19
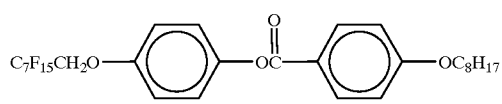
II-20
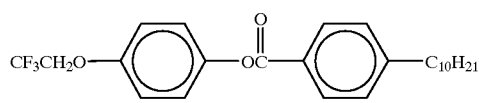
II-21
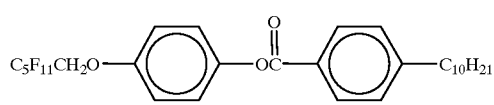
II-22
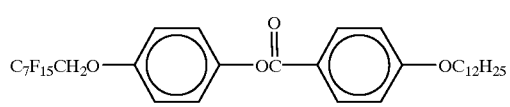
II-23

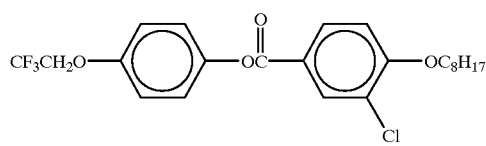
II-24
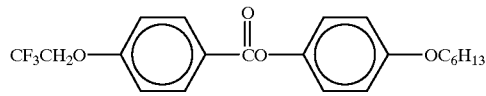
II-25
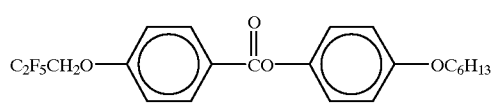
II-26
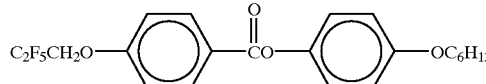
II-27
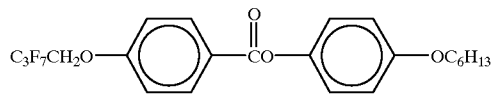
II-28
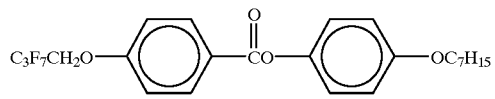
II-29
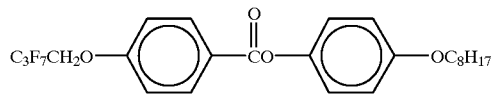
II-30
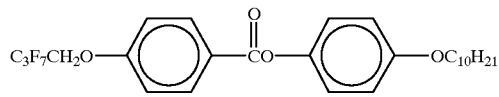
II-31
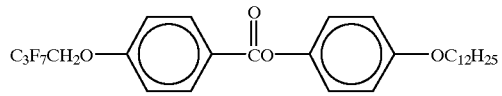
II-32
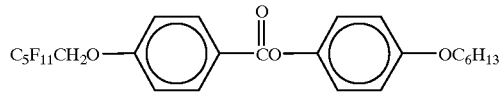
II-33
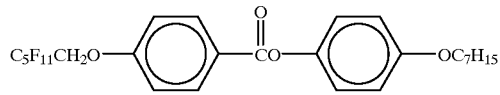
II-34
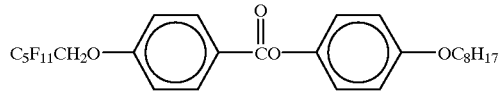
II-35
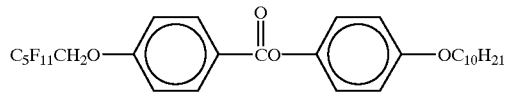
II-36
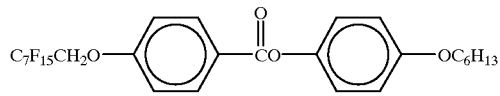

-continued
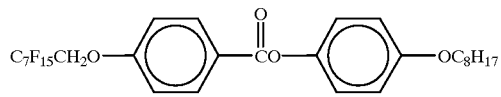
II-37
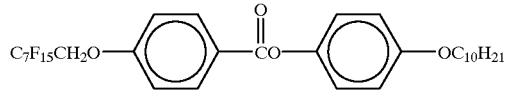
II-38
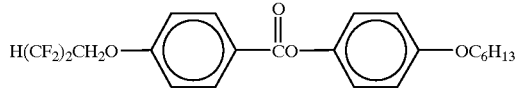
II-39
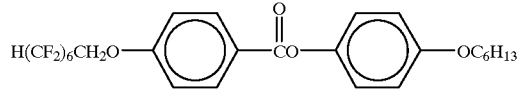
II-40
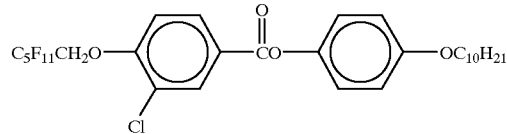
II-41
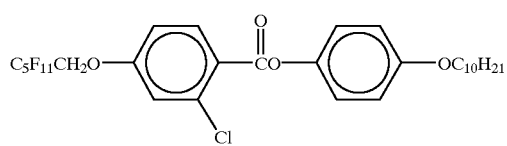
II-42
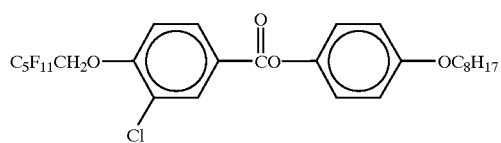
II-43
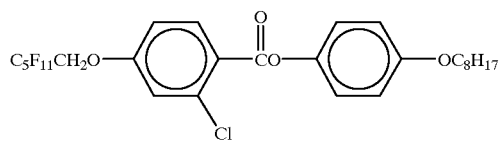
II-44
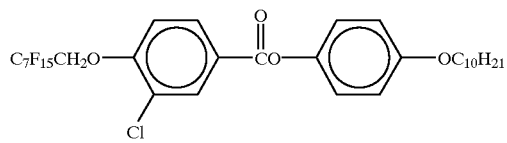
II-45
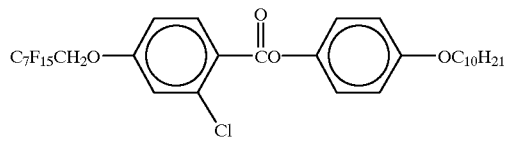
II-46
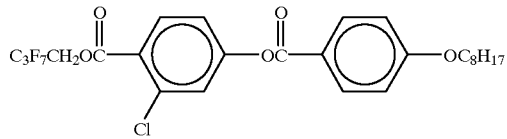
II-47

-continued
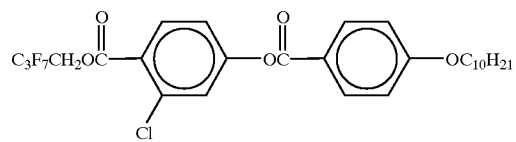
II-48
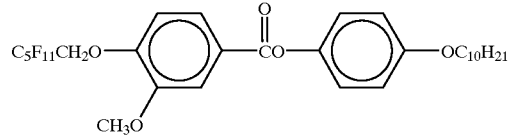
II-49
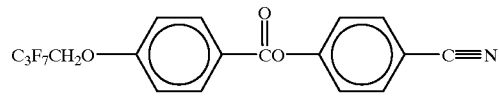
II-50
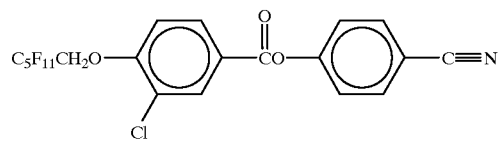
II-51
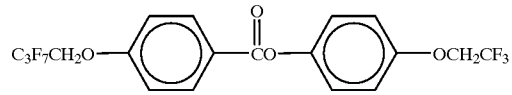
II-52
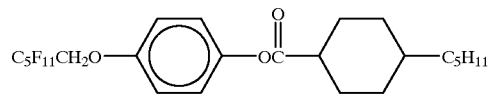
II-53
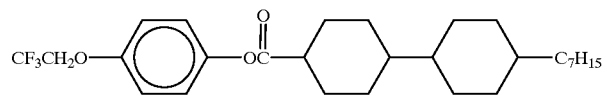
II-54
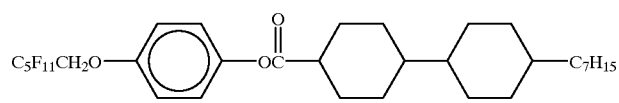
II-55
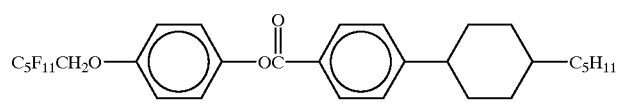
II-56
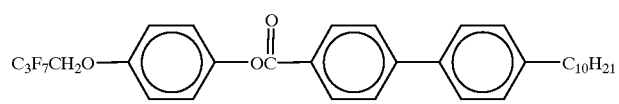
II-57
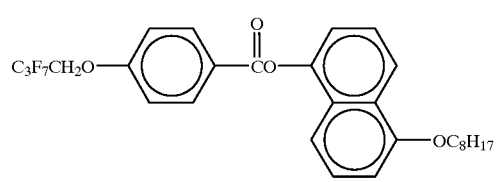
II-58

-continued
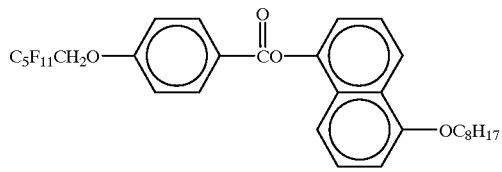
II-59
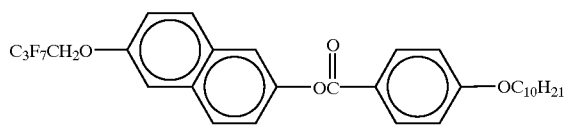
II-60
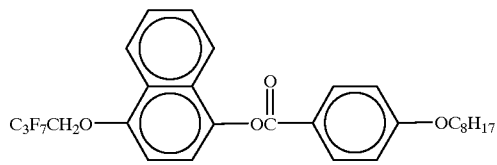
II-61
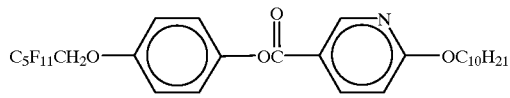
II-62
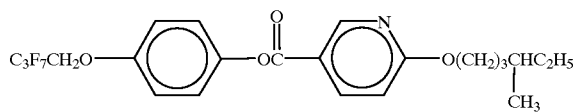
II-63
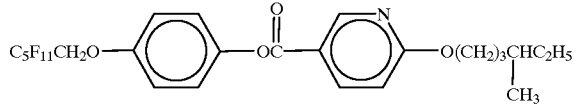
II-64
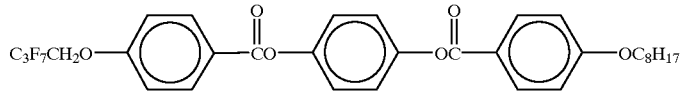
II-65
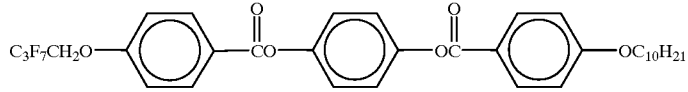
II-66
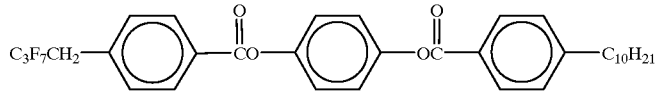
II-67
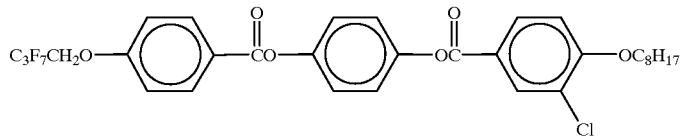
II-68
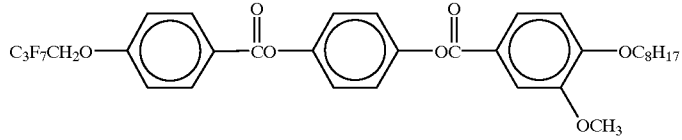
II-69

-continued
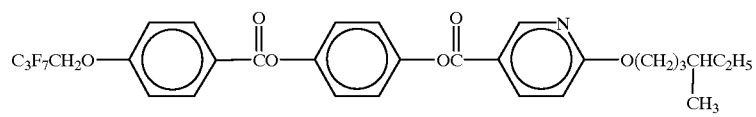
II-70
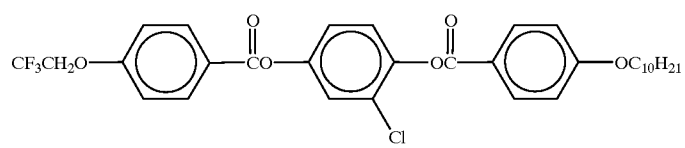
II-71
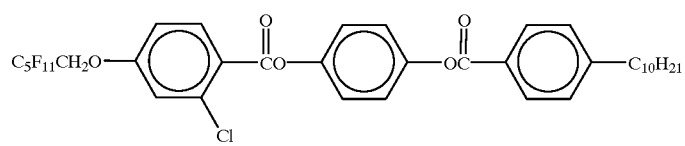
II-72
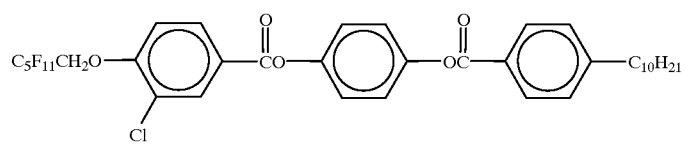
II-73
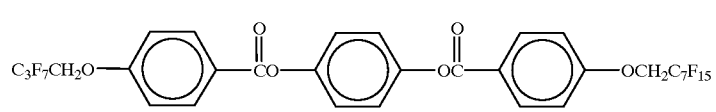
II-74
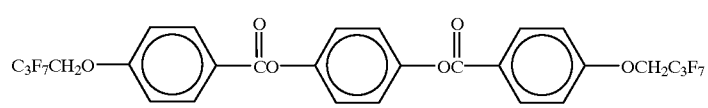
II-75
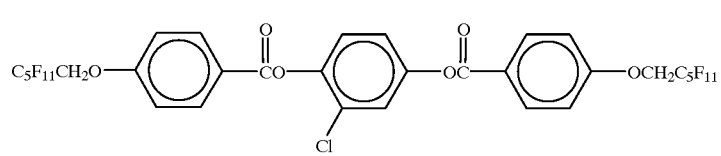
II-76
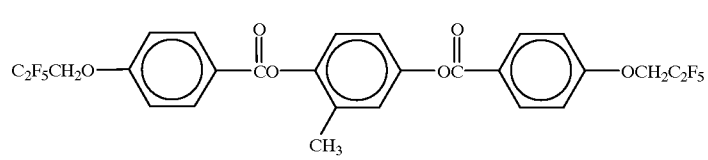
II-77
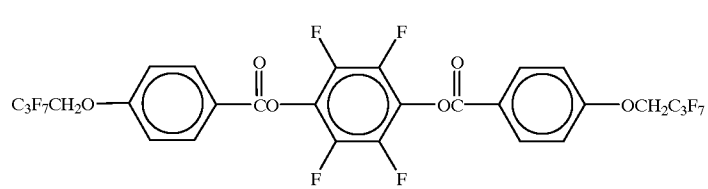
II-78
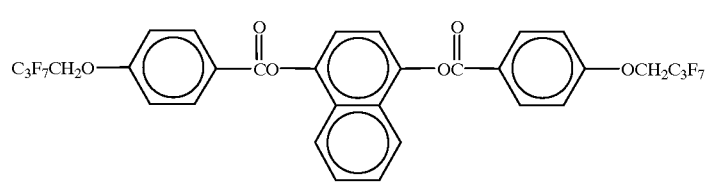
II-79

II-80
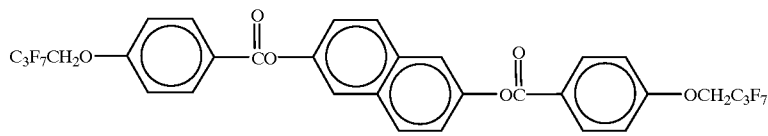
II-81
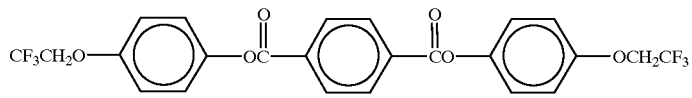
II-82
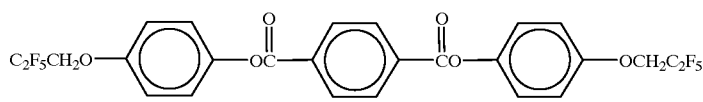
II-83
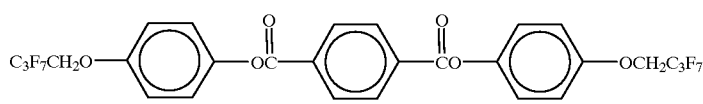
II-84
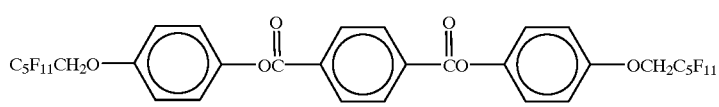
II-85
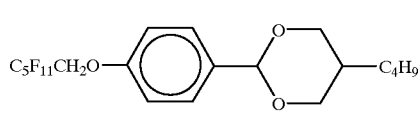
II-86
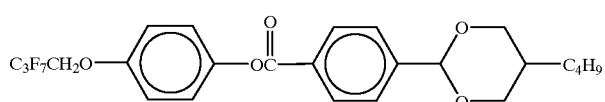
II-87
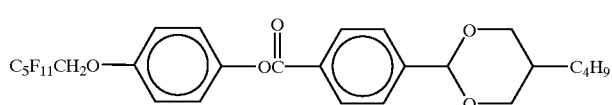
II-88
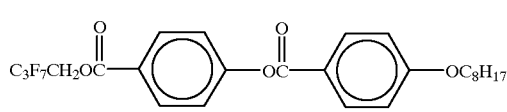
II-89
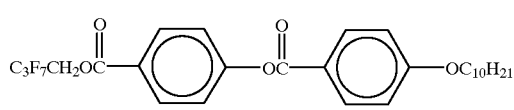
II-90
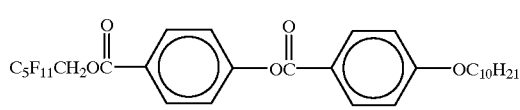
II-91
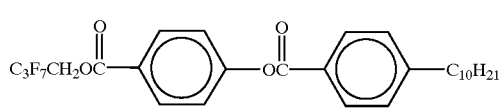
II-92
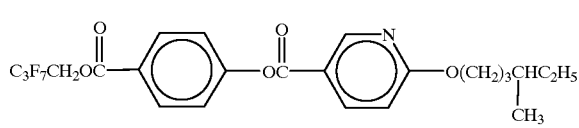

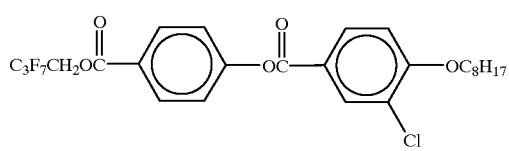
II-93
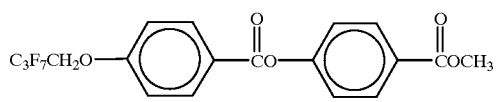
II-94
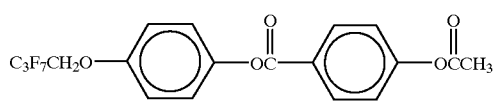
II-95
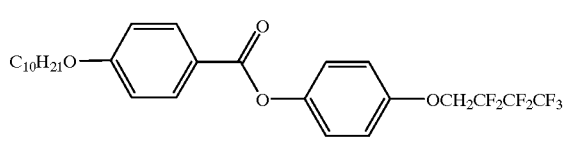
II-96
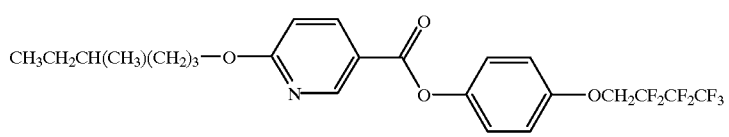
II-97
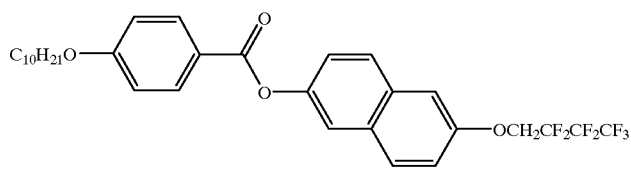
II-98
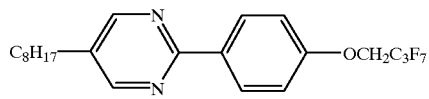
II-99
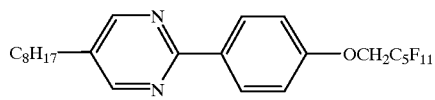
II-100
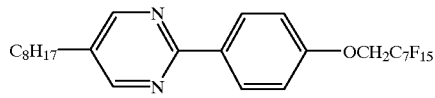
II-101
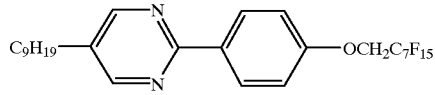
II-102
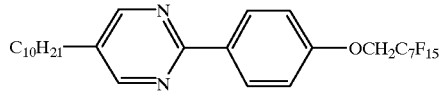
II-103
The compounds represented by the general formula (III) may be obtained though a process described in PCT Publication WO93/2396 (corr. to JP (Tokuhyo) 7-506368). Specific examples thereof are enumerated below.

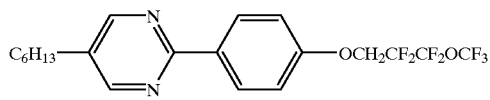  III-1
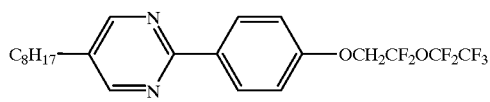  III-2
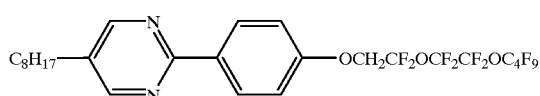  III-3
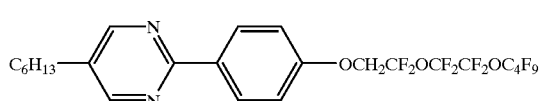  III-4
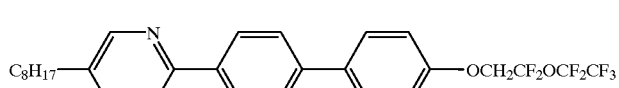  III-5
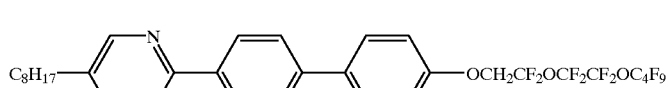  III-6
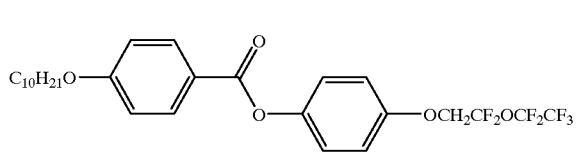  III-7
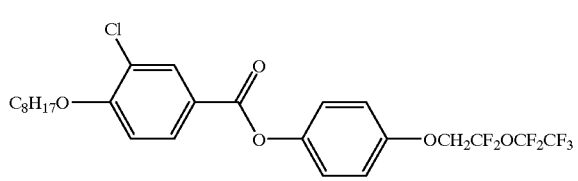  III-8
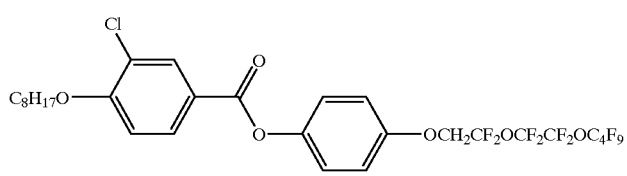  III-9
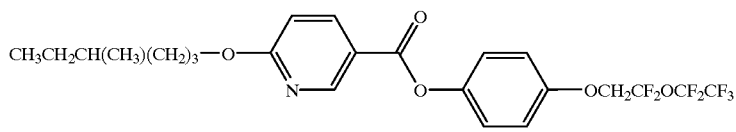  III-10
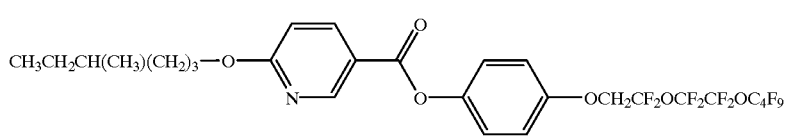  III-11

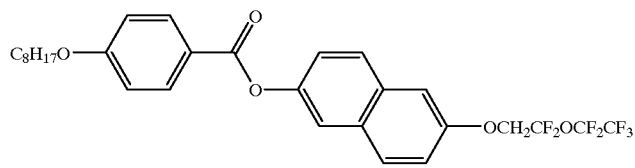
III-12
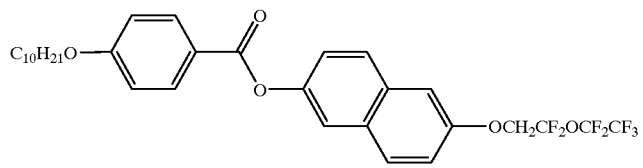
III-13
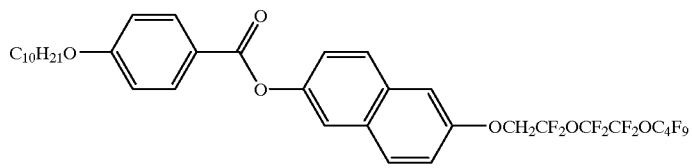
III-14
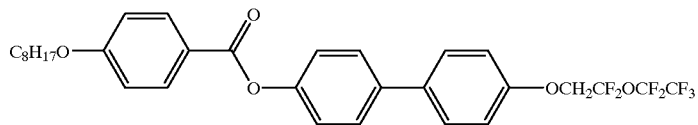
III-15
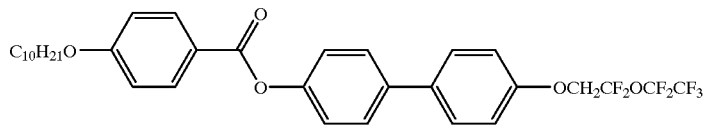
III-16
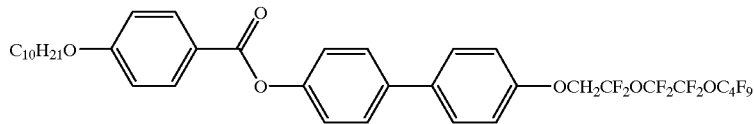
III-17
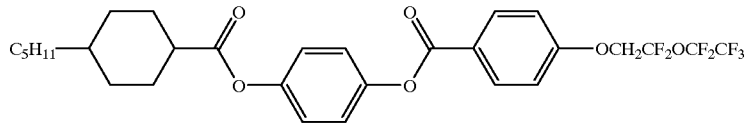
III-18
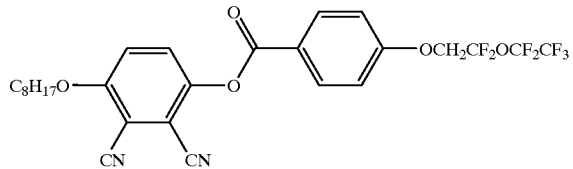
III-19
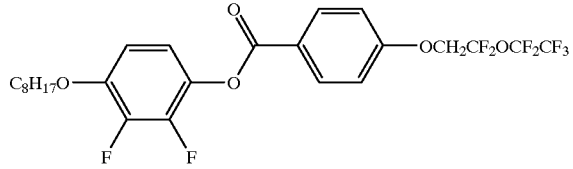
III-20

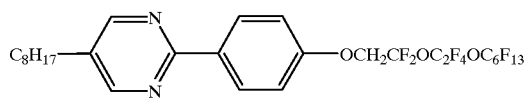
III-21
III-22
III-23
III-24
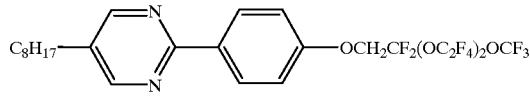
III-25
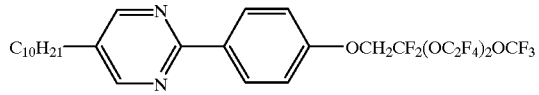
III-26
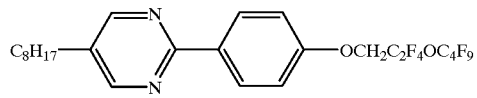
III-27
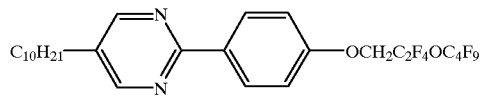
III-28
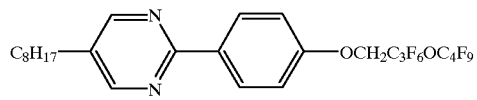
III-29
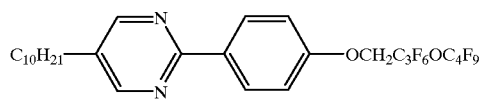
III-30
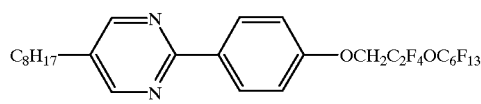
III-31
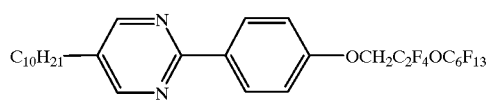
III-32
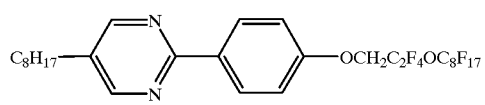
III-33

-continued
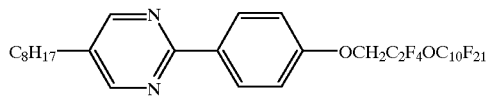
III-34
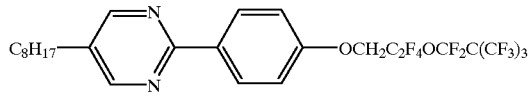
III-35
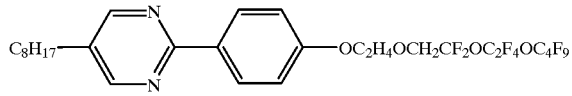
III-36
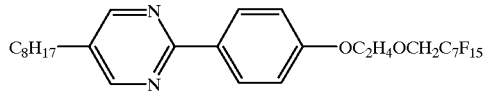
III-37
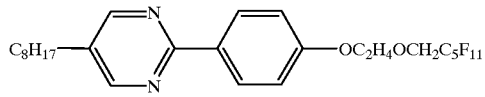
III-38
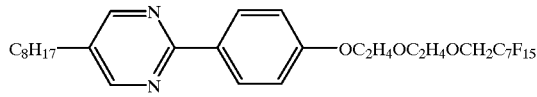
III-39
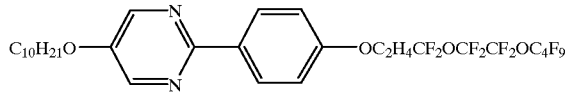
III-40
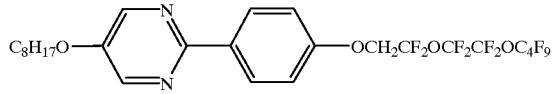
III-41
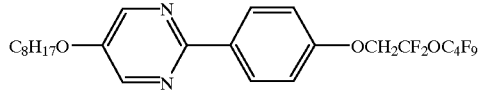
III-42
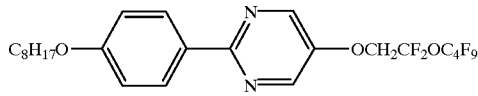
III-43
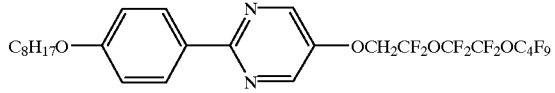
III-44
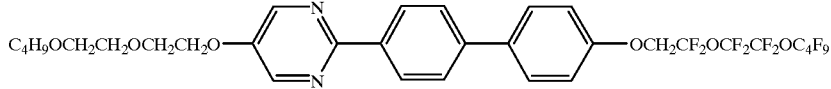
III-45
The chiral smectic liquid crystal composition used in the present invention may further contain a chiral compound, examples of which are enumerated below.

1
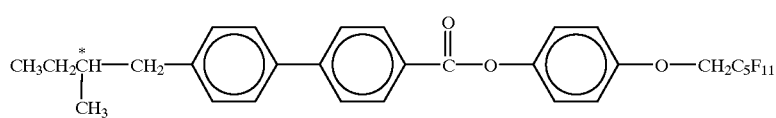
2
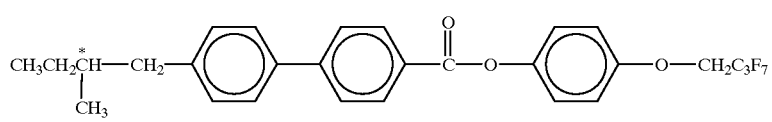
3
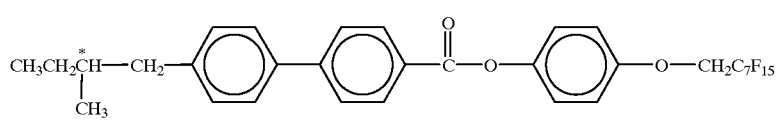
4
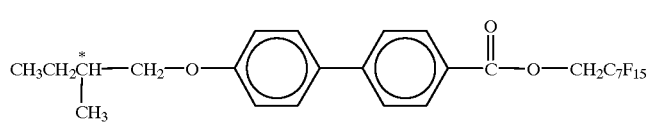
5
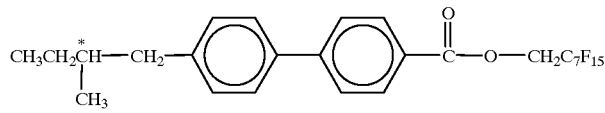
6
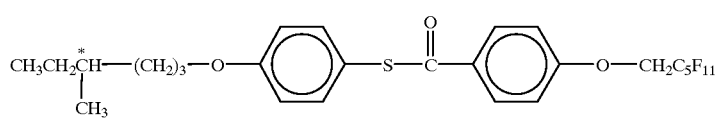
7
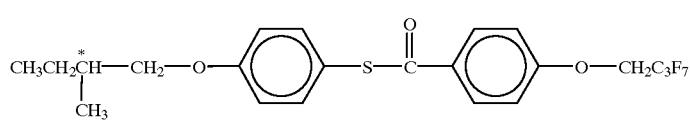
8
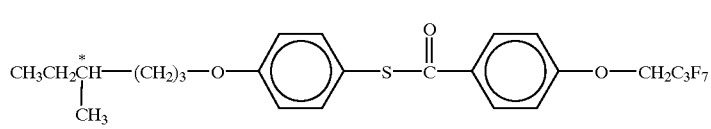
9
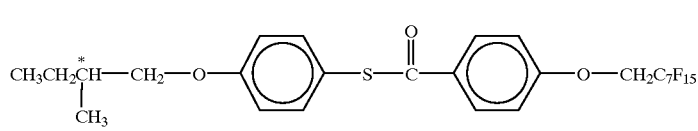
10
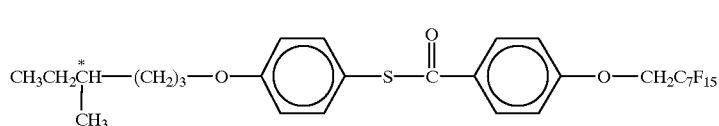
11
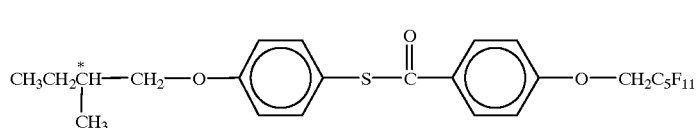
12
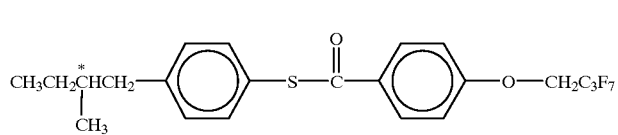

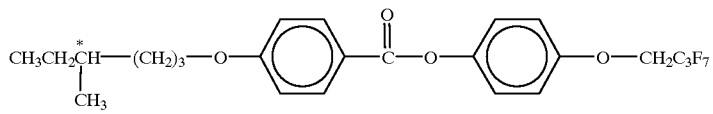
13
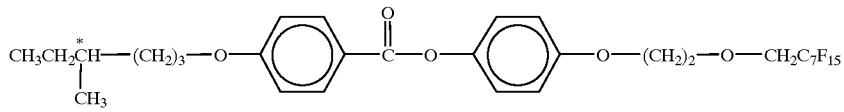
14
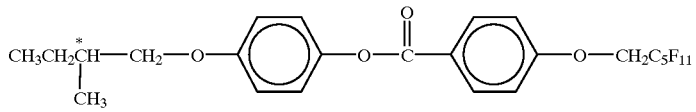
15
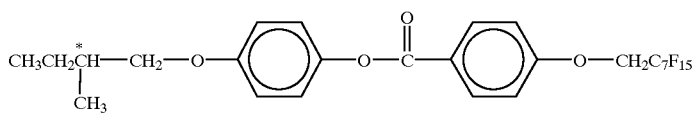
16
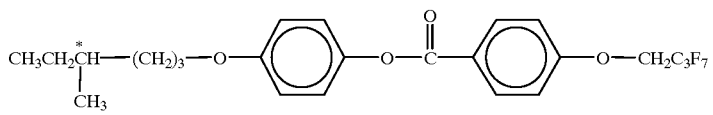
17
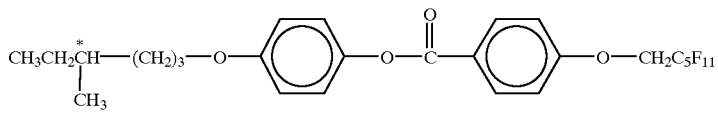
18
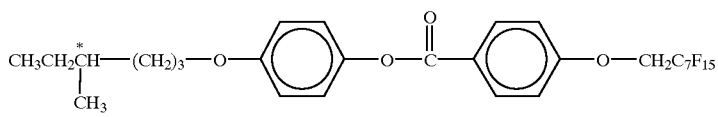
19
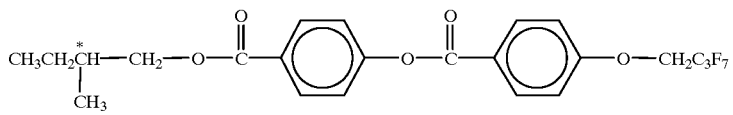
20
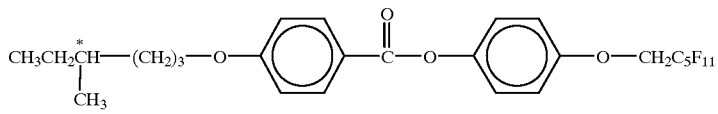
21
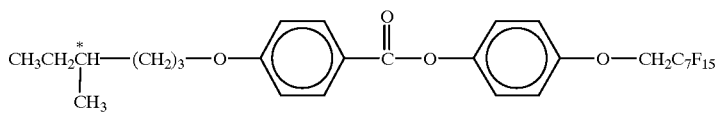
22
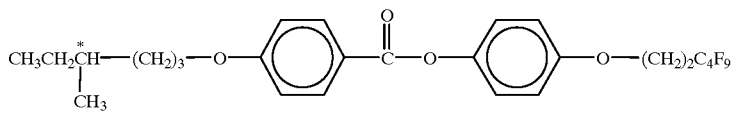
23
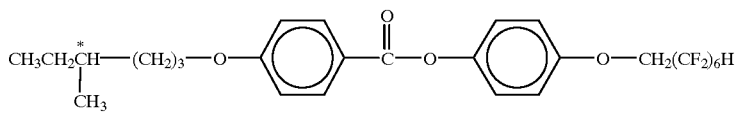
24

-continued
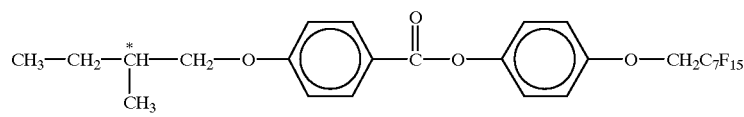
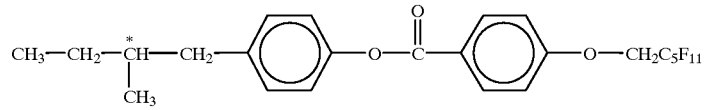
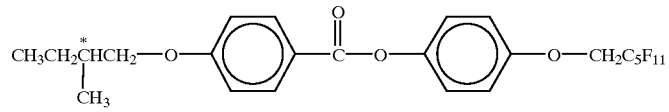
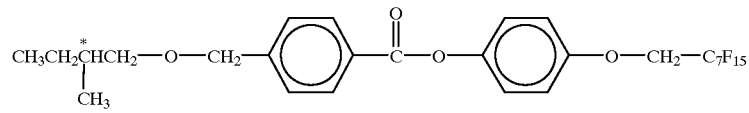
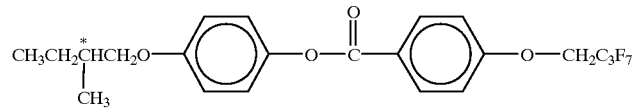
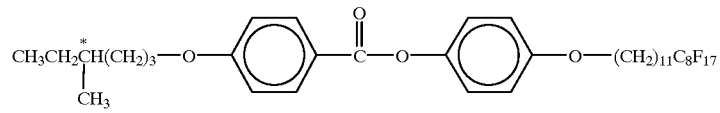
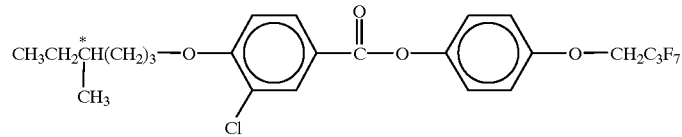
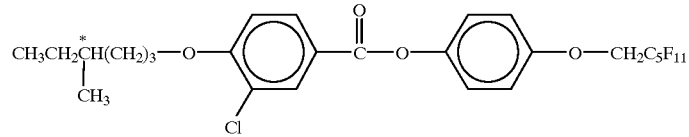
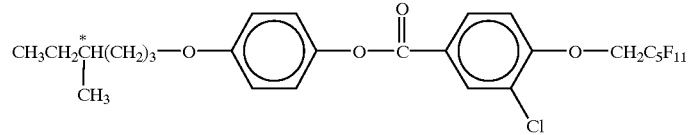
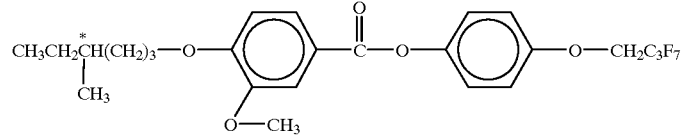
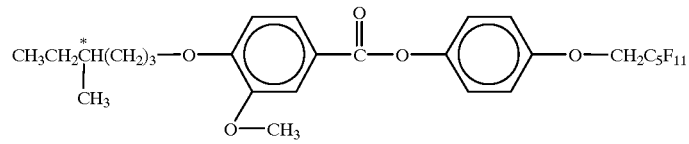

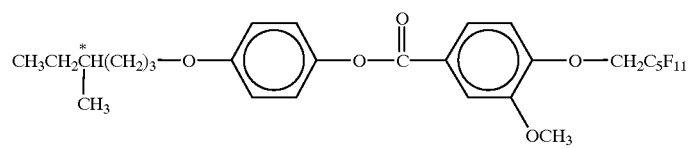
36
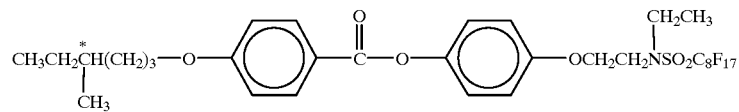
37
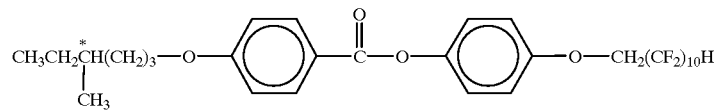
38
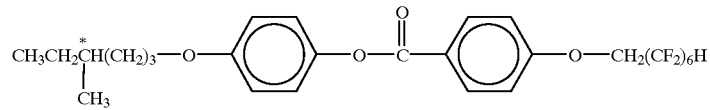
39
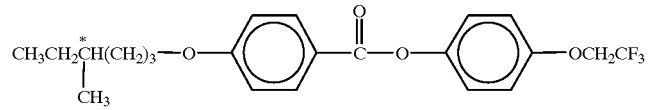
40
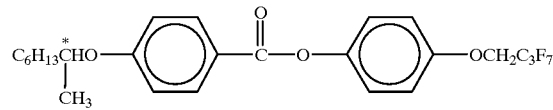
41
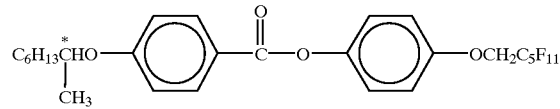
42
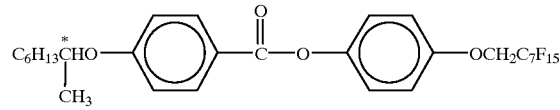
43
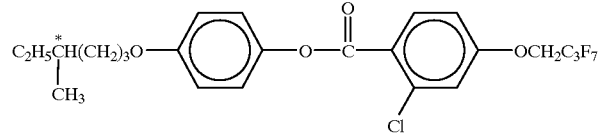
44
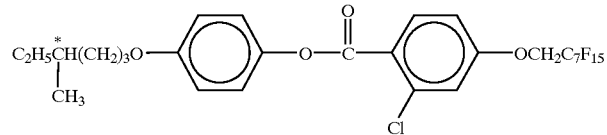
45
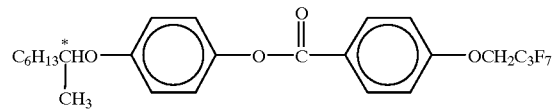
46

-continued
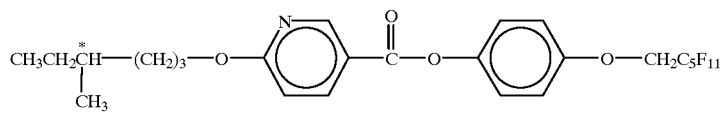
47
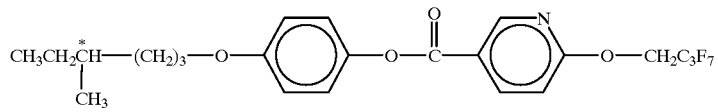
48
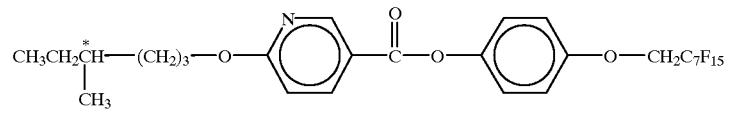
49
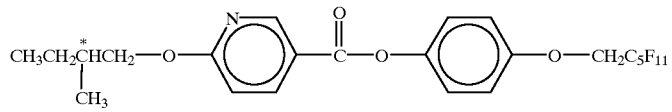
50
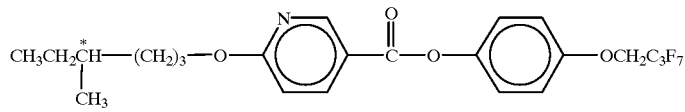
51
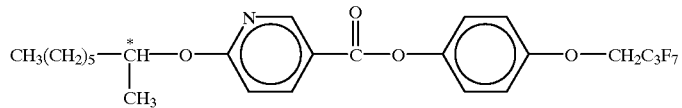
52
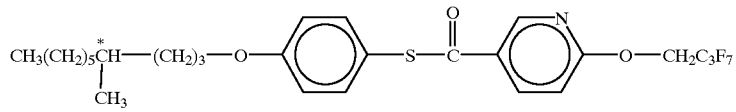
53
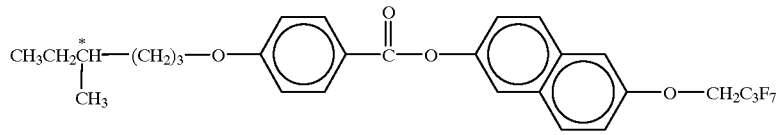
54
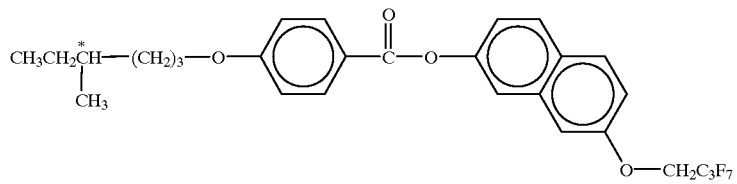
55
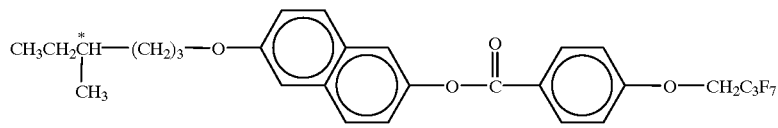
56
57

58
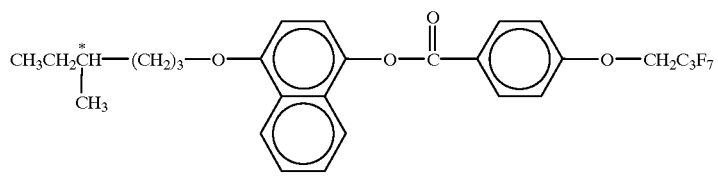
59
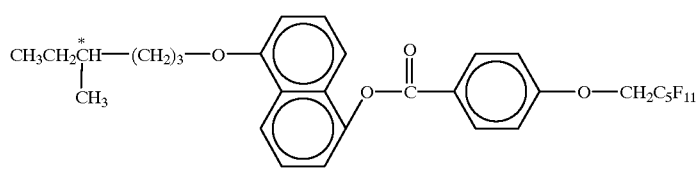
60
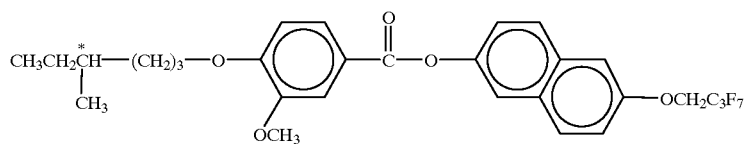
61
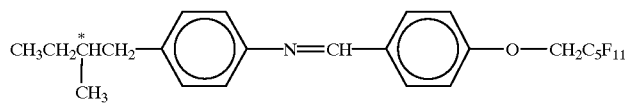
62
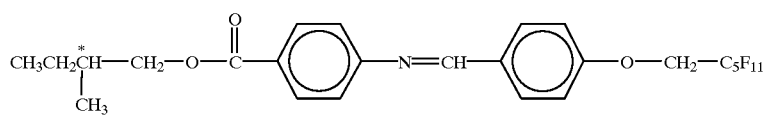
63
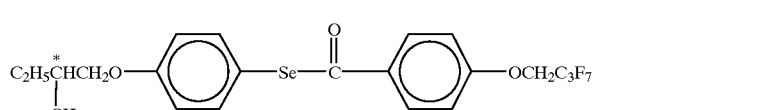
64
65
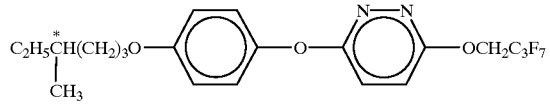
66
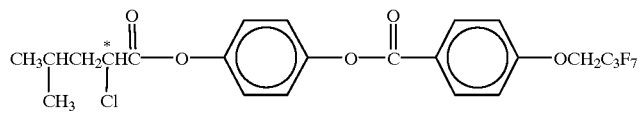
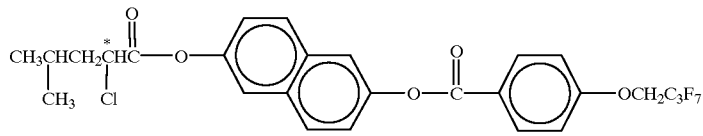
67
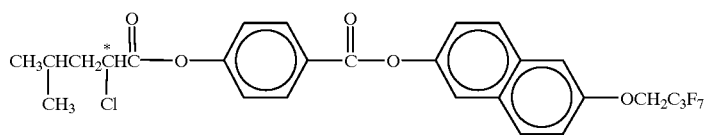

-continued

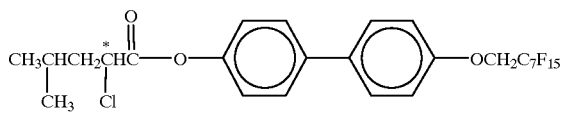
68

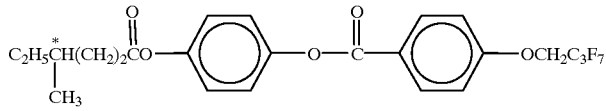
69

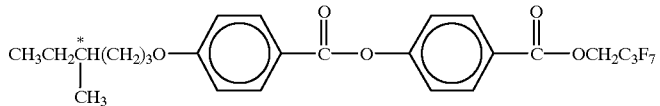
70

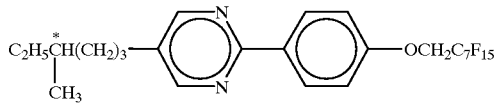
71

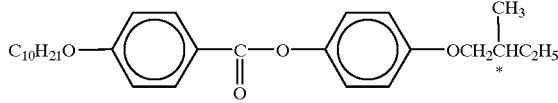
72

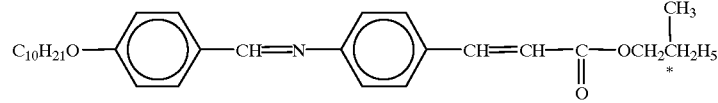
73

These chiral compounds may be used singly or in mixture of two or more species to provide an appropriate chirality to the chiral smectic liquid crystal composition used in the present invention.

More specifically, the liquid crystal composition used in the present invention may include a mesomorphic compound having a fluorocarbon terminal portion as an essential component and also contain a chiral compound as described in a proportion of 0.5–50 wt. %. In case where the chiral compound has no fluorine-containing terminal portion, the chiral compound may preferably be used in a proportion of 0.1–10 wt. % of the resultant liquid crystal composition in view of mutual solubility with the essential mesomorphic compound having a fluorocarbon terminal portion.

The chiral smectic liquid crystal composition used in the present invention can further contain various other mesomorphic compounds appropriately selected from chiral compounds other than those described above and achiral compounds so as to control mutual solubility of the component compounds, and the resultant layer spacing, and further an optional additive, such as an antioxidant, an ultraviolet absorber, a dye or a pigment.

The liquid crystal device according to the present invention is characterized by the use of the above-mentioned chiral smectic liquid crystal composition to form a liquid crystal layer disposed between a pair of substrates at least one of which is provided with an alignment control layer comprising the above-mentioned polyimide, and other structures thereof are not particularly restricted.

The liquid crystal device according to the present invention can constitute various liquid crystal apparatus inclusive of display apparatus and optical shutter. For example, a liquid crystal display apparatus 101 having a control system as illustrated by its block diagram shown in FIG. 4 may be constituted by using a liquid crystal device according to the present invention as a display panel 103.

Figure 4:
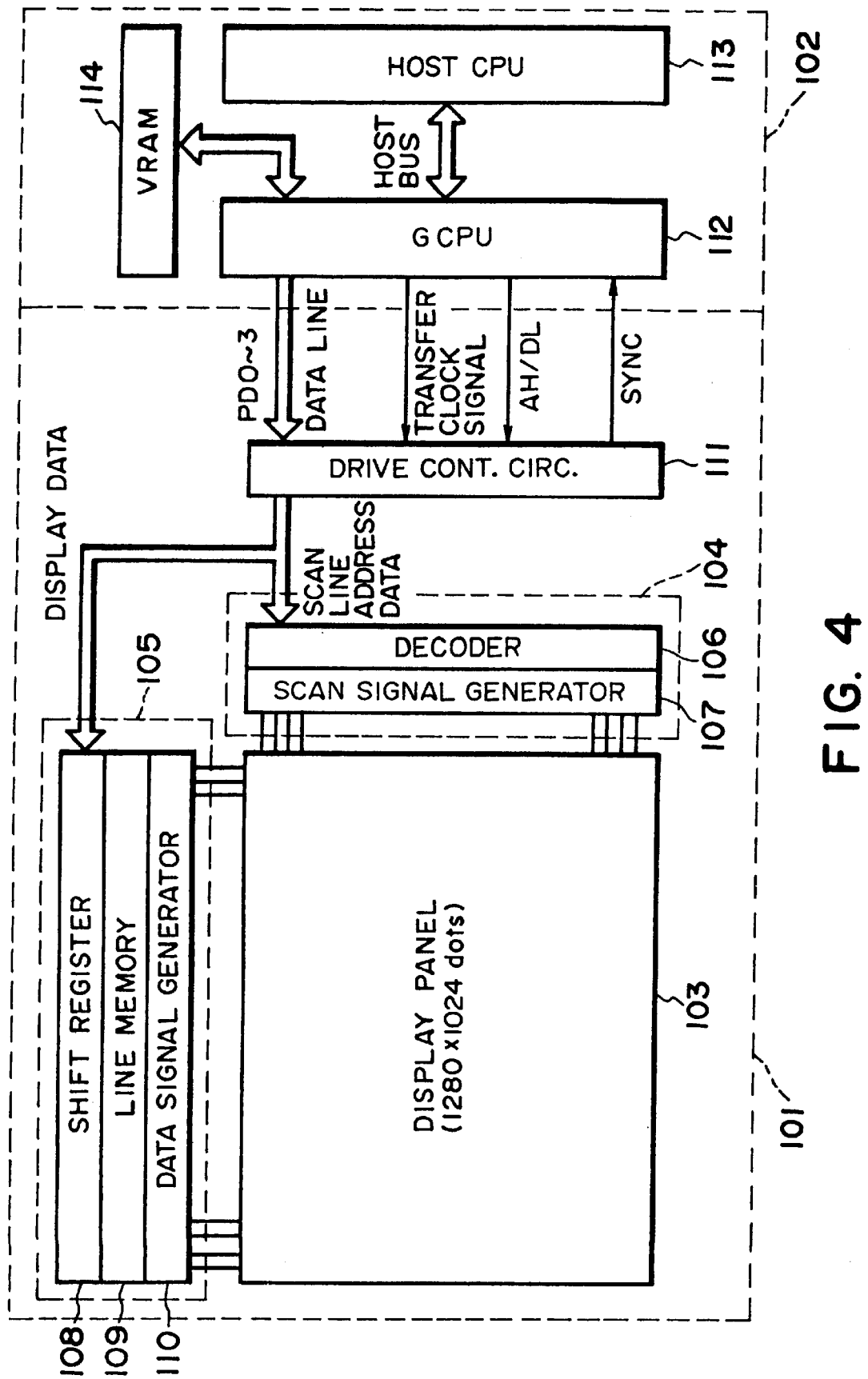
FIG. 4 is a block diagram of a liquid crystal apparatus (display apparatus) including a liquid crystal deice using a chiral smectic liquid crystal composition and a graphic controller.

Referring to FIG. 4, the liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (video-RAM or VRAM) 114.

Figure 5:
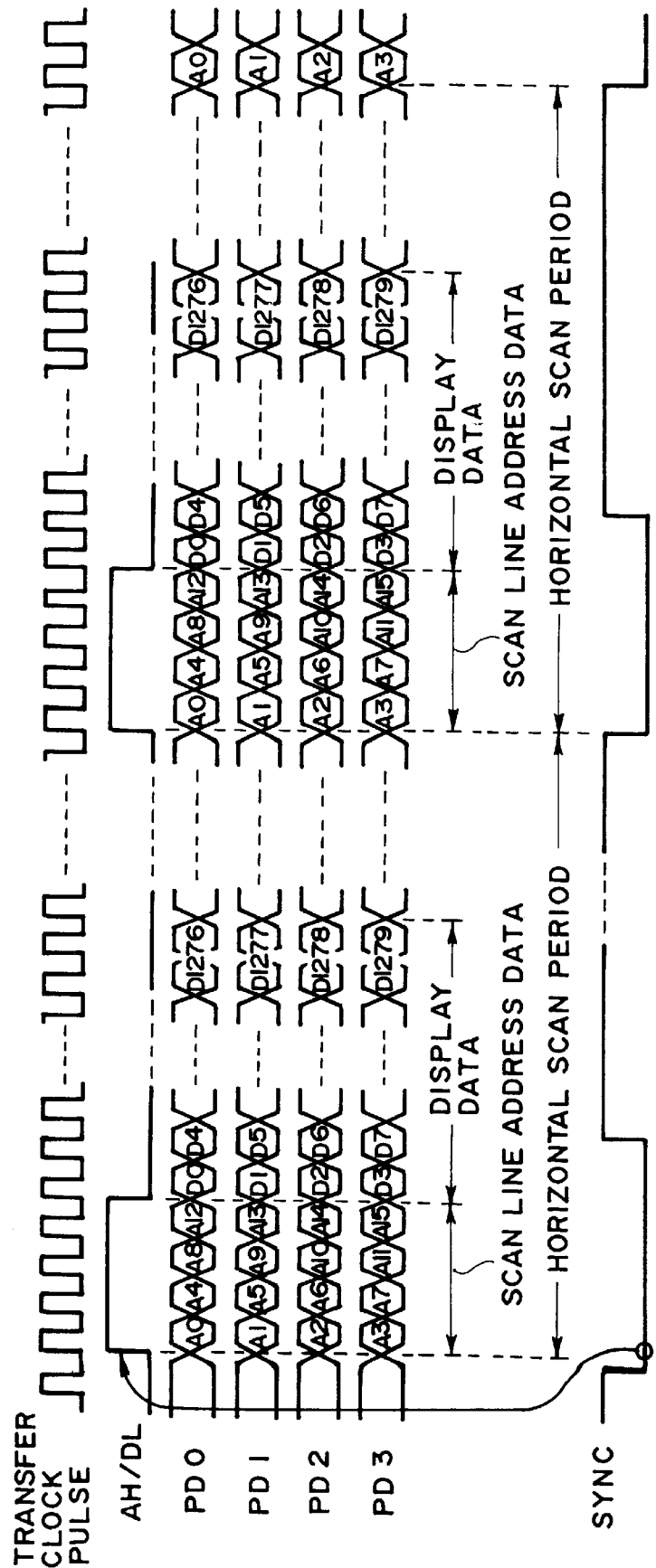
FIG. 5 is a time chart illustrating a manner of image data communication between the display data and the graphic controller.

FIG. 5 is a time chart illustrating a manner of data communication for transferring image data including scanning line address data and certain data format as illustrated by using a communication synchronizing means based on a SYNC signal.

More specifically, image data is generated from a graphic controller 102 in an apparatus main body and is transferred to the display panel 103 by signal transfer means as illustrated in FIGS. 4 and 5. The graphic controller 102 includes graphic central processing unit (GCPU) 112 and image data storage memory (VRAM) 114 as core units and is in charge of control and communication of image data between a host CPU 113 therein and the liquid crystal display apparatus 101. Incidentally, a light source (backlight) may be disposed, as desired, behind the display panel 103.

In case where the liquid crystal device according to the present invention is used to constitute a display device, the liquid crystal composition as a display medium assumes a chiral smectic layer structure of a bookshelf or one close thereto having a small layer inclination angle which is in a good alignment state, shows a good responsiveness and can provide a large area of good display image having high resolution, high brightness and excellent contrast.

Hereinbelow, the present invention will be described based on Examples, a liquid crystal composition comprising a 95/5 (ratio by weight) mixture of the following compounds A and B was used.

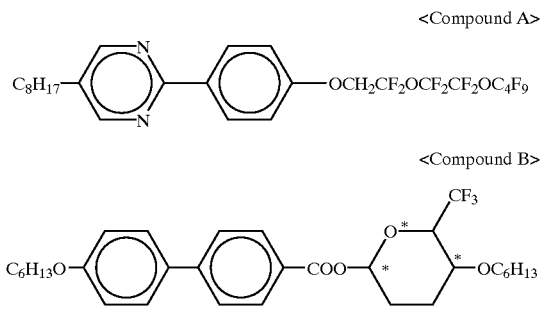

The liquid crystal composition showed the following physical properties.

Phase transition series

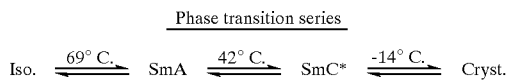

(Iso: isotropic phase, SmA: smectic A phase, SmC*: chiral smectic C phase, Cryst: crystal)

Tilt angle (30° C.): θ=25.8 deg.
Spontaneous polarization: Ps=−22.6 (nC/cm$^2$)
Layer inclination angle (30° C.): δ=0 deg.
$d_{min}/d_A$=3.179 (nm)/3.187 (nm)=0.997

Figure 7:
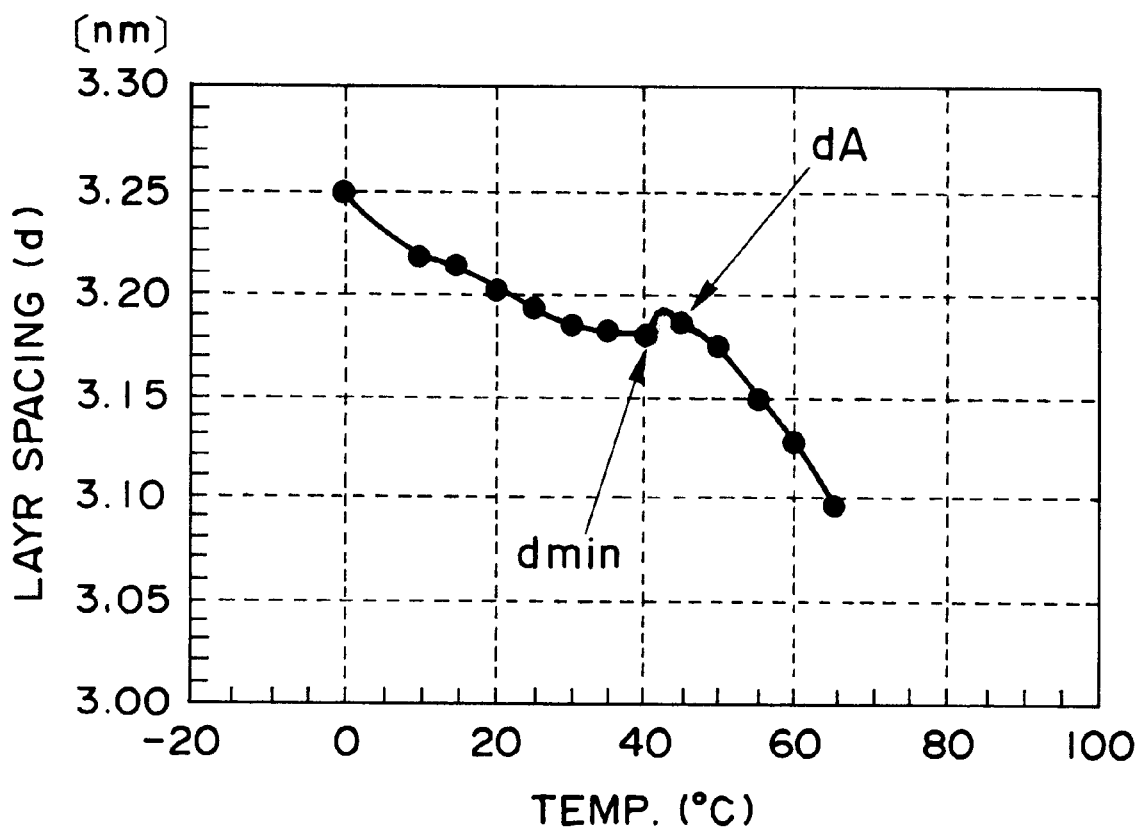
FIG. 7 is a graph showing a temperature dependence of layer spacing (d) of a chiral smectic liquid crystal composition used in Examples appearing hereinafter.

FIG. 7 is a graph showing a temperature-dependence of layer spacing of the above-mentioned liquid crystal composition. In FIG. 7, $d_A$ represents a layer spacing at a first transition point (ca. 42° C.) and $d_{min}$ represents a layer spacing at a second transition point (ca. 40° C.).

The layer spacing d and the layer inclination angle δ were measured in the following manner.

The methods used were basically similar to the method used by Clark and Lagerwall (Japan Display '86, Sep. 30–Oct. 2, 1986, p.p. 456–458) or the method of Ohuchi et al (J.J.A.P., 27 (5) (1988), p.p. 725–728). The measurement was performed by using a X-ray diffraction apparatus (available from MAC Science having a rotary cathode-type X-ray generating unit), and 80 μm-thick glass sheets ("Microsheets", available from Corning Glass Works) were used as substrates so as to minimize the heat capacity and the X-ray absorption with the glass substrates.

More specifically, for measurement of the layer spacing d, a sample liquid crystal composition was applied in a 5 mm-square size so as to form a flat surface on the 80 μm-thick glass sheet and, while being temperature-controlled by a temperature-controlling plate and a temperature-monitoring thermocouple, irradiated with X rays from a rotary X-ray source, so that the output light including diffraction rays was detected by a detector (counter), similarly as in the ordinary powder X-ray diffraction. An angle providing a peak of X-ray intensity was substituted in the Bragg's formula for diffraction condition to obtain a layer spacing d.

Each sample liquid crystal composition was first brought to its isotropic phase temperature, and the measurement was repeated every 3° C. or every 1° C. in the vicinity of a transition point while cooling the sample down to a temperature where no diffraction peak was observed. The auto-matic temperature controller used allowed a control accuracy of ±0.3° C. at each measurement temperature.

The measurement was performed by using CuKα-rays (1.54050 Å) at a power of 45 kV–100 mA as analyzing rays and using a slit system including DS of 0.05 mm, SS of 0.05 mm and RS of 0.05 mm. The scanning was performed at a rate of 3 deg./min.

For the measurement of smectic layer inclination angle δ, a sample cell having a cell gap of 80 μm was prepared by using a pair of the 80 μm-thick glass sheets while using the same glass sheet as a spacer. A sample liquid crystal composition filling the sample cell was heated to isotropic phase and then gradually cooled to be homogeneously aligned under application of a magnetic field in a direction parallel to the substrates by an electromagnet. Then, the X-ray detector was set at the angle 2θ giving the above-mentioned layer spacing d, and the sample cell was subjected to θ-scanning. From the measured values, δ was calculated according to the method described in the above-mentioned references.

According to the above-described method, it is possible to obtain a layer inclination angle δ intrinsic to a sample liquid crystal composition while substantially removing the effect of a cell thickness thereon. However, it is also possible to obtain a substantially identical δ value in the temperature range of ca. 20° C. to 60° C. by using a 1.2 μm-thick cell having rubbed alignment films of polyimides (like those obtained from a commercially available polyimide precursor, such as "LP-64", "SP-710" or "SP-510" (available from Toray K. K.) instead of such an 80 μm-thick cell subjected to a magnetic field aligning treatment.

EXAMPLE 1

Two 1.1 mm-thick glass substrates each provided with a ca. 70 nm-thick ITO film were provided, and further coated with alignment control films by spin coating under different conditions.

More specifically, one substrate (first substrate) was spin-coated at 500 rpm for 15 sec. and then at 1500 rpm for 30 sec. with a solution in an N-methylpyrrolidone/n-butyl cellosolve (=2/1) mixture solvent containing 0.8 wt. % (as solid) of a polyamic acid as a precursor to a polyimide represented by a recurring unit of the following formula (obtained from a reaction of cyclobutanetetracarboxylic dianhydride (trans/cis=8/2) with hexamethylenediamine; both available from Aldrich Co.), followed by pre-drying at 80° C. for 5 min. and hot baking at 200° C. for 1 hour, to form a 6 nm-thick alignment film, which was then rubbed with a nylon cloth as a uniaxial aligning treatment.

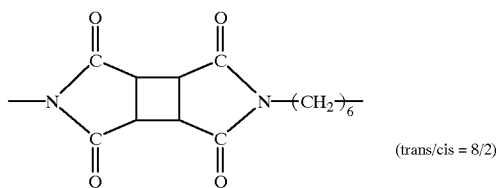

(trans/cis = 8/2)

The other substrate (second substrate) was coated with 0.4 wt. %-solution in butanol of a silicone-type oligomer ("Glass Resin GR650" (trade name), mfd. by Techneglas Inc.) by spin coating at 2500 rpm for 20 sec., followed by pre-drying at 80° C. for 5 min and hot-drying at 180° C. for 1 hour, to form a 5 nm-thick film.

Then, spacer silica beads of 2.0 μm in average diameter were dispersed on the first substrate and the second substrate onto which an adhesive was applied was superposed thereon to form a blank cell, which was then filled with the above-mentioned chiral smectic liquid crystal composition heated into its isotropic state under vacuum, followed by gradual cooling at a rate of 1° C./min. to room temperature to align liquid crystal molecules, thus producing a liquid crystal device.

The thus-prepared liquid crystal device exhibited a high contrast of 85 as measured according to the following method (as a method for evaluating the alignment characteristic).

First, a sample liquid crystal device was sandwiched between a pair of polarizers disposed in right-angle cross nicols and supplied with driving waveforms as shown in FIG. 6A (enlarged in FIGS. 6AA and 6AB) (20 V/$\mu$m, $\frac{1}{3}$ bias, duty factor of $\frac{1}{1000}$). Pulse widths were adjusted to cause bistable switching. At a first switched state, the liquid crystal device was rotated so as to find the darkest position where the transmitted light intensity Ib (as shown in FIG. 6B) was measured by a photomultiplier. Then, after switching into a second state, the light intensity Iw at the brightest state (as shown in FIG. 6B) was measured. From the results, a contrast ratio (CR) as an evaluation factor was obtained as a ratio Iw/Ib. The value CR is a measure of an alignment uniformity and is decreased also in the case of alignment defects causing light leakage therethrough to provide a larger Ib value.

EXAMPLE 2

A liquid crystal device was prepared by injecting the above-mentioned liquid crystal composition into a cell which was prepared in the same manner as in Example 1 except for forming an alignment control film of a polyimide having the following recurring unit by hot baking on the first substrate. The device showed a contrast of 78.

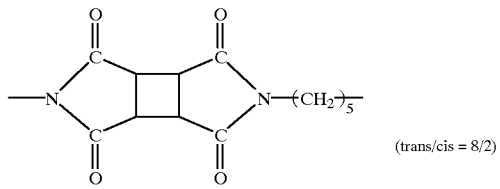

(trans/cis = 8/2)

EXAMPLE 3

A liquid crystal device was prepared by injecting the above-mentioned liquid crystal composition into a cell which was prepared in the same manner as in Example 1 except for forming an alignment control film of a silicon coupling agent ("ODS-E", mfd. by Chisso K.K.) applied in a 0.5 wt. %-solution in ethanol on the second substrate. The device showed a contrast of 80.

EXAMPLE 4

A liquid crystal device was prepared by injecting the above-mentioned liquid crystal composition into a cell which was prepared in the same manner as in Example 1 except for forming an alignment control film of a polyimide having the following recurring unit by hot baking on the first substrate. The device showed a contrast of 100.

The polyamic acid was prepared in the following manner.

In a 1 liter-glass flask equipped with a 500 W moderate-pressure mercury lamp, 100 g (1.02 M) of maleic anhydride and 1 kg of ethyl acetate were placed and mixed to provide a homogeneous solution. Under stirring in an argon atmosphere, the solution was irradiated with light by using the mercury lamp for 8 hours at 20° C. to precipitate a crystal. After the reaction, the crystal was recovered by filtration to obtain 3.3 g of cyclobutanetetracarboxylic dianhydride (100% trans form).

The cyclobutanetetracarboxylic dianhydride was reacted with hexamethylenediamine (available from Aldrich Co.) in an ordinary manner to obtain a polyamic acid as a precursor for the polyimide having the recurring unit shown below.

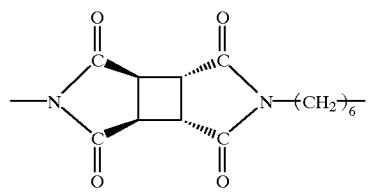

COMPARATIVE EXAMPLE 1

A liquid crystal device was prepared by injecting the above-mentioned liquid crystal composition into a cell which was prepared in the same manner as in Example 1 except for forming an alignment control film of a polyimide having the following recurring unit by hot baking on the first substrate. The device showed a contrast of 30.

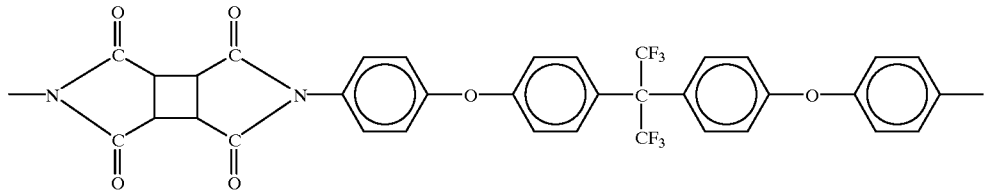

COMPARATIVE EXAMPLE 2

A liquid crystal device was prepared by injecting the above-mentioned liquid crystal composition into a cell which was prepared in the same manner as in Example 1 except for forming an alignment control film of a polyimide having the following recurring unit by hot baking on the first substrate. The device showed a contrast of 6.

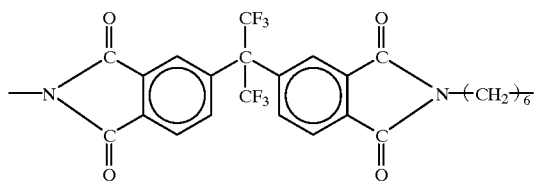

COMPARATIVE EXAMPLE 3

A liquid crystal device was prepared by injecting the above-mentioned liquid crystal composition into a cell which was prepared in the same manner as in Example 1 except for forming the same rubbed polyimide alignment control film formed on the first substrate also on the second substrate and the substrates were superposed so that their rubbed directions were parallel and identical to each other. The device showed a contrast of 52.

COMPARATIVE EXAMPLE 4

A liquid crystal device was prepared in the same manner as in Example 1 except for replacing the liquid crystal composition with a chiral smectic liquid crystal composition ("CS-1014" (trade name), mfd. by Chisso K. K.) showing physical properties shown below. The device showed a contrast of 12.

Phase transition series

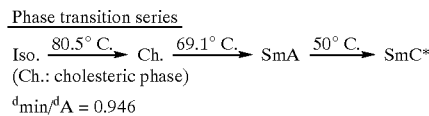

(Ch.: cholesteric phase)

$d_{min}/d_A = 0.946$

As is understood from the results of the above-described Examples and Comparative Examples, it has become possible to provide a liquid crystal device including a uniform and good alignment state of a chiral smectic liquid crystal composition satisfying a relationship of $d_{min}/d_A \geq 0.990$ which may lack Ch phase and typically contain a compound comprising a fluorocarbon terminal portion and a hydrocarbon terminal portion connected with a central core and having smectic phase or latent smectic phase by using an alignment control film comprising a polyimide having a recurring unit represented by the general formula (I).

Further, when the liquid crystal device used in the above Examples according to the present invention were subjected to measurement of threshold voltages (as a drive characteristic) before and after a continuous drive for 600 hours, all the devices in Examples 1–4 showed a change in threshold voltages within 4% (3% for Examples 1–3 and 4% for Example 4). On the other hand, the devices in Comparative Examples 1 and 3 showed a change in threshold voltages of 12% and 10%, respectively. In the device of Comparative Example 2, a change in threshold voltages was unmeasurable due to a poor uniaxial aligning property. Further, the device of Comparative Example 4 showed a splay alignment state of liquid crystal molecules, thus resulting in a change in threshold voltages of 0% However the device provided a low contrast.

As a result, the liquid crystal device of the present invention was found to be effective in suppressing the monostabilization phenomenon when compared with those of Comparative Examples 1–4 and an ordinary ferroelectric liquid crystal device providing a larger change in threshold voltages of at least 10%.

As described above, according to the present invention, there is provided a liquid crystal device stably allowing a liquid crystal layer of a bookshelf structure or a structure close thereto in a good alignment state, so that the device can exhibit excellent performances including a high contrast, a high-speed responsiveness and, for display, a high resolution and a high brightness.

According to the present invention, there is provided a liquid crystal display apparatus with a large area and excellent display performances by using the above-mentioned chiral smectic liquid crystal composition.

What is claimed is:

1. A liquid crystal device, comprising: a pair of substrates each having thereon a transparent electrode, and a chiral smectic liquid crystal composition lacking cholesteric phase disposed between the substrates so as to assume at least two optically stable states, wherein at least one of the substrates is provided with an alignment film which comprises a polyimide represented by a recurring unit of formula (I) shown below and has been subjected to a uniaxial aligning treatment, and said chiral smectic liquid crystal composition has a layer spacing-changing characteristic providing a layer spacing $d_A$ at a first transition point where the layer spacing of the liquid crystal composition begins to decrease at a discontinuously larger decrease rate on temperature decrease in vicinity of a transition temperature from smectic A phase to chiral smectic C phase and a layer spacing $d_{min}$ at a second transition point where the layer spacing of the liquid crystal composition begins to increase on further temperature decrease from the first transition point, wherein $0.990 \leq d_{min}/d_A$, Formula (I):

$$\begin{array}{c} O \quad\quad O \\ \parallel \quad\quad \parallel \\ C \quad\quad C \\ -N \diagup \diagdown A \diagup \diagdown N-(CH_2)_n- \\ C \quad\quad C \\ \parallel \quad\quad \parallel \\ O \quad\quad O \end{array}$$

wherein A denotes a tetravalent aliphatic hydrocarbon group free from a planar structure or a tetravalent alicyclic hydrocarbon group, and n is an integer of at least 1.

2. A liquid crystal device according to claim 1, wherein n in the formula (I) is an even number of 2–10.

3. A liquid crystal device according to claim 1 or 2, wherein said chiral smectic liquid crystal composition has ferroelectricity.

4. A liquid crystal device according to any one of claims 1 to 3, wherein A in the formula (I) is

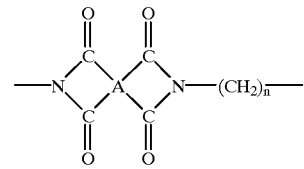

5. A liquid crystal device according to claim 4, wherein A in the formula (I) is

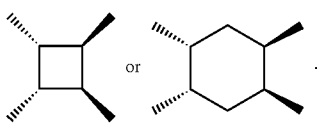

6. A liquid crystal device, comprising: a pair of substrates each having thereon a transparent electrode, and a chiral smectic liquid crystal composition disposed between the substrates so as to assume at least two optically stable states,
wherein at least one of the substrates is provided with an alignment film which comprises a polyimide represented by a recurring unit of formula (I) shown below and has been subjected to a uniaxial aligning treatment, and
said chiral smectic liquid crystal composition comprises at least one species of fluorine-containing mesomorphic compound comprising a fluorocarbon terminal portion and a hydrocarbon terminal portion connected with a central core and having a smectic phase or a latent smectic phase;

Formula (I):

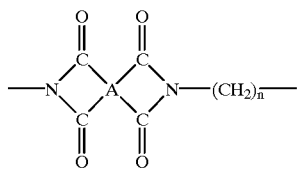

wherein A denotes a tetravalent aliphatic hydrocarbon group free from a planar structure or a tetravalent alicyclic hydrocarbon group, and n is an integer of at least 1.

7. A liquid crystal device according to claim 6, wherein n in the formula (I) is an even number of 2–10.

8. A liquid crystal device according to claim 6 or 7, wherein said chiral smectic liquid crystal composition has ferroelectricity.

9. A liquid crystal device according to any one of claims 6 to 8, wherein A in the formula (I) is

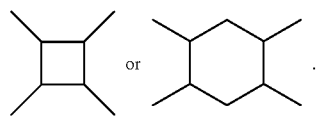

10. A liquid crystal device according to claim 9, wherein A in the formula (I) is

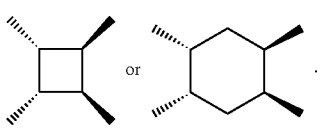

11. A liquid crystal device according to claim 6, wherein said fluorocarbon terminal portion of the fluorine-containing mesomorphic compound is a group represented by the formula —$D^1$—$F_{xa}G_{2xa}$—X, where xa is 1–20; X is —H or —F; —$D^1$— is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—N$(C_{pa}H_{2pa+1})$—$SO_2$— or —$(CH_2)_{ra}$—N$(C_{pa}H_{2pa+1})$—CO—; where ra and rb are independently 1–20; and pa is 0–4.

12. A liquid crystal device according to claim 6, wherein said fluorocarbon terminal portion of the fluorine-containing mesomorphic compound is a group represented by the formula —$D^2$—$(C_{xb}F_{2xb}$—O$)_{za}$—$C_{ya}F_{2ya+1}$, where xb is 1–10 independently for each $(C_{xb}F_{2xb}$—O); ya is 1–10; za is 1–10; —$D^2$— is —CO—O—$C_{rc}H_{2rc}$, —O—$C_{rc}H_{2rc}$—, —$C_{rc}H_{2rc}$—, —O—$(C_{sa}H_{2sa}$—O$)_{ta}$—$C_{rd}H_{2rd}$—, —O—$SO_2$—, —$SO_2$—, —$SO_2$—$C_{rc}H_{2rc}$—, —$C_{rc}H_{2rc}$—N$(C_{pb}H_{2pb+1})$—$SO_2$—, —$C_{rc}H_{2rc}$—N$(C_{pb}H_{2pb+1})$—CO—, or a covalent bond, where rc and rd are independently 1–20; sa is independently 1–10 for each $(C_{sa}H_{2sa}$—O); ta is 1–6; and pb is 0–4.

13. A liquid crystal device according to claim 6, wherein said fluorine-containing mesomorphic compound is represented by the general formula (II):

Formula (II):

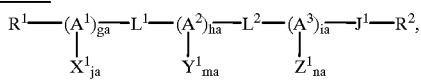

where $A^1$, $A^2$ and $A^3$ are each independently

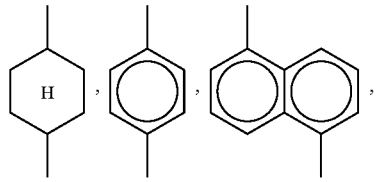

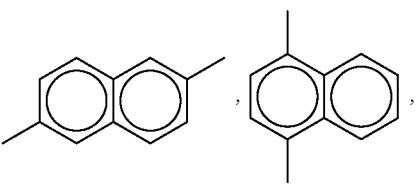

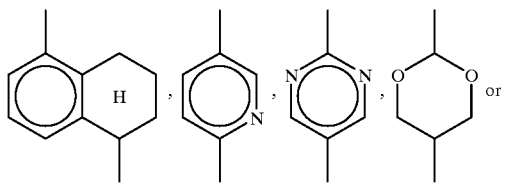

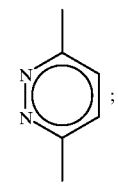

ga, ha and ia are independently an integer of 0–3 with the proviso that the sum of ga+ha+ia be at least 2;

$L^1$ and $L^2$ are each independently a covalent bond, —CO—O—, —O—CO—, —COS—, —S—CO—, —CO—Se—, —Se—CO—, —CO—Te—, —Te—CO—, —$CH_2CH_2$—, —CH=CH—, —C≡C—, —CH=N—, —N=CH—, —$CH_2$—O—, —O—$CH_2$—, —CO— or —O—;

$X^1$, $Y^1$ and $Z^1$ are each a substituent of $A^1$, $A^2$ and $A^3$, respectively, and each of $X^1$, $Y^1$ and $Z^1$ are independently —H, —Cl, —F, —Br, —I, —OH, —OCH$_3$, —CH$_3$, —CN or —NO$_2$;

each ja, ma and na are independently an integer of 0–4;

$J^1$ is —CO—O—(CH$_2$)$_{ra}$—, —O—(CH$_2$)$_{ra}$—, —(CH$_2$)$_{ra}$—, —O—SO$_2$—, —SO$_2$—, —SO$_2$—(CH$_2$)$_{ra}$—, —O—(CH$_2$)$_{ra}$—O—(CH$_2$)$_{rb}$—, —(CH$_2$)$_{ra}$—N(C$_{pa}$H$_{2pa+1}$)—SO$_2$— or —(CH$_2$)$_{ra}$—N(C$_{pa}$H$_{2pa+1}$)—CO—; where ra and rb are independently 1–20, and pa is 0–4;

$R^1$ is —O—C$_{qa}$H$_{2qa}$—O—C$_{qb}$H$_{2qb+1}$, —C$_{qa}$H$_{2qa}$—O—C$_{qb}$H$_{2qb+1}$, —C$_{qa}$H$_{2qa}$—R$^3$, —O—C$_{qa}$H$_{2qa}$—R$^3$, —CO—O—C$_{qa}$H$_{2qa}$—R$^3$, or —O—CO—C$_{qa}$H$_{2qa}$—R$^3$ which may be either straight chain or branched; where R$^3$ is —O—CO—C$_{qb}$H$_{2qb+1}$, —CO—O—C$_{qb}$H$_{2qb+1}$, —H, —Cl, —F, —CF$_3$, —NO$_2$ or —CN; and qa and qb are independently 1–20;

$R^2$ is C$_{xa}$F$_{2xa}$—X, where X is —H or —F, xa is an integer of 1–20.

14. A liquid crystal device according to claim 6, wherein said fluorine-containing mesomorphic compound is represented by the general formula (III):

Formula (III):

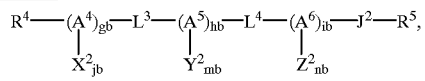

wherein A$^4$, A$^5$ and A$^6$ are each independently

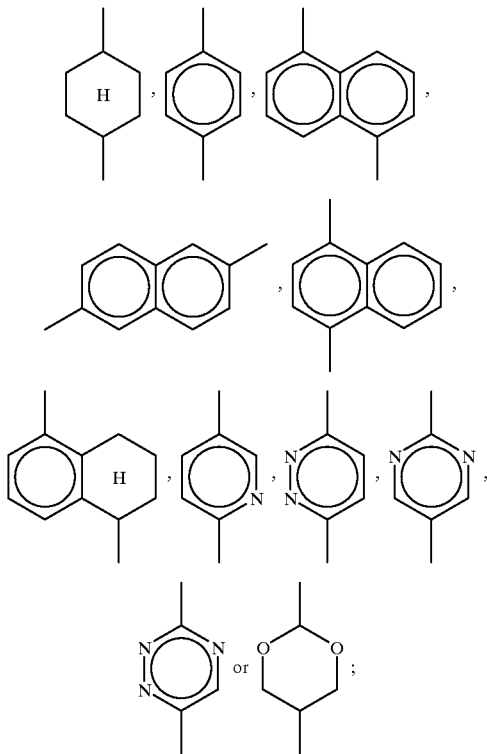

gb, hb and ib are each independently an integer of 0–3 with the proviso that the sum of gb+hb+ib be at least 2;

each L$^3$ and L$^4$ are independently a covalent bond, —CO—O—, —O—CO—, —CO—S—, —S—CO—, —CO—Se—, —Se—CO—, —CO—Te—, —Te—CO—, —(CH$_2$CH$_2$)$_{ka}$— (ka is 1–4), —CH=CH—, —C≡C—, —CH=N—, —N=CH—, —CH$_2$—O—, —O—CH$_2$—, —CO— or —O—;

X$^2$, Y$^2$ and Z$^2$ are each a substituent of A$^4$, A$^5$ and A$^6$, respectively, and each X$_2$, Y$_2$ and Z$_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

$J^2$ is —CO—O—C$_{rc}$H$_{2rc}$—, —O—C$_{rc}$H$_{2rc}$—, —C$_{rc}$H$_{2rc}$—, —O(C$_{sa}$H$_{2sa}$—O)$_{ta}$—C$_{rd}$H$_{2rd}$—, —O—SO$_2$—, —SO$_2$—, —SO$_2$—C$_{rc}$H$_{2rc}$—, —C$_{rc}$H$_{2rc}$—N(C$_{pb}$H$_{2pb+1}$)—SO$_2$— or —C$_{rc}$H$_{2rc}$—N(C$_{pb}$H$_{2pb+1}$)—CO—; rc and rd are independently 1–20; sa is independently 1–10 for each (C$_{sa}$H$_{2sa}$—O), ta is 1–6; and pb is 0–4;

$R^4$ is —O—(C$_{qc}$H$_{2qc}$—O)$_{wa}$—C$_{qd}$H$_{2qd+1}$, —(C$_{qc}$H$_{2qc}$—O)$_{wa}$—C$_{qd}$H$_{2qd+1}$, —C$_{qc}$H$_{2qc}$—R$^6$, —O—C$_{qc}$H$_{2qc}$—R$^6$, —CO—O—C$_{qc}$H$_{2qc}$—R$^6$, or O—CO—C$_{qc}$H$_{2qc}$—R$^6$ which may be either straight chain or branched; R$^6$ is —O—CO—C$_{qd}$H$_{2qd+1}$; —CO—O—C$_{qd}$H$_{2qd+1}$, —Cl, —F, —CF$_3$, —NO$_2$, —CN or —H; qc and qd are independently an integer of 1–20; wa is an integer of 1–10;

$R^5$ is (C$_{xb}$F$_{2xb}$—O)$_{za}$—C$_{ya}$F$_{2ya+1}$, wherein xb is independently 1–10 for each (C$_{xb}$F$_{2xb}$—O); ya is 1–10; and za is 1–10.

15. A liquid crystal device, comprising: a pair of substrates each having thereon a transparent electrode, and a chiral smectic liquid crystal composition disposed between the substrates so as to assume at least two optically stable states,
wherein one of the substrates is provided with an alignment film which comprises a polyimide represented by a recurring unit of formula (I) shown below and has been subjected to a uniaxial aligning treatment, and
the other substrate is provided with an alignment film which has not been subjected to a uniaxial aligning treatment;

Formula (I):

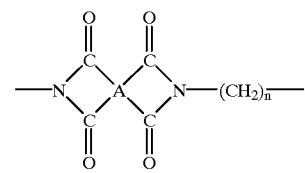

wherein A denotes a tetravalent aliphatic hydrocarbon group free from a planar structure or a tetravalent alicyclic hydrocarbon group, and n is an integer of at least 1.

16. A liquid crystal device according to claim 15, wherein n in the formula (I) is an even number of 2–10.

17. A liquid crystal device according to claim 15 or 16, wherein said chiral smectic liquid crystal composition has ferroelectricity.

18. A liquid crystal device according to any one of claims 15 to 17, wherein A in the formula (I) is

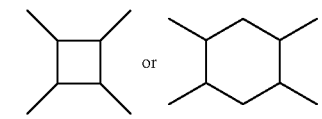

.

19. A liquid crystal device according to claim 18, wherein A in the formula (I) is

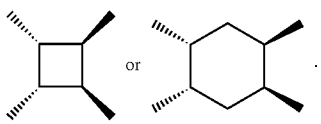

20. The liquid crystal device according to claim 1, wherein A denotes a tetravalent alicyclic hydrocarbon group.

21. The liquid crystal device according to claim 2, wherein A denotes a tetravalent alicyclic hydrocarbon group.

22. The liquid crystal device according to claim 3, wherein A denotes a tetravalent alicyclic hydrocarbon group.

23. The liquid crystal device according to claim 4, wherein A denotes a tetravalent alicyclic hydrocarbon group.

24. The liquid crystal device according to claim 5, wherein A denotes a tetravalent alicyclic hydrocarbon group.

25. The liquid crystal device according to claim 6, wherein A denotes a tetravalent alicyclic hydrocarbon group.

26. The liquid crystal device according to claim 7, wherein A denotes a tetravalent alicyclic hydrocarbon group.

27. The liquid crystal device according to claim 8, wherein A denotes a tetravalent alicyclic hydrocarbon group.

28. The Liquid crystal device according to claim 9, wherein A denotes a tetravalent alicyclic hydrocarbon group.

29. The liquid crystal device according to claim 10, wherein A denotes a tetravalent alicyclic hydrocarbon group.

30. The liquid crystal device according to claim 11, wherein A denotes a tetravalent alicyclic hydrocarbon group.

31. The liquid crystal device according to claim 12, wherein A denotes a tetravalent alicyclic hydrocarbon group.

32. The liquid crystal device according to claim 13, wherein A denotes a tetravalent alicyclic hydrocarbon group.

33. The liquid crystal device according to claim 14, wherein A denotes a tetravalent alicyclic hydrocarbon group.

34. The liquid crystal device according to claim 15, wherein A denotes a tetravalent alicyclic hydrocarbon group.

35. The liquid crystal device according to claim 16, wherein A denotes a tetravalent alicyclic hydrocarbon group.

36. The liquid crystal device according to claim 17, wherein A denotes a tetravalent alicyclic hydrocarbon group.

37. The liquid crystal device according to claim 18, wherein A denotes a tetravalent alicyclic hydrocarbon group.

38. The liquid crystal device according to claim 19, wherein A denotes a tetravalent alicyclic hydrocarbon group.

* * * * *

UNITED STATES PATENT AND TRADEMARK OFFICE
CERTIFICATE OF CORRECTION

PATENT NO. : 6,001,276
DATED : December 14, 1999
INVENTOR(S) : MASANOBU ASAOKA ET AL.

It is certified that error appears in the above-identified patent and that said Letters Patent is hereby corrected as shown below:

ON THE TITLE PAGE [73]:

Assignee, "Canon Kabishiki Kaisha" should read --Canon Kabushiki Kaisha--.

ON THE TITLE PAGE [56] References Cited:

FOREIGN PATENT DOCUMENTS, "2142753" should read --2-142753--.

FIGURE 7:

Sheet 7, "LAYR" should read --LAYER--.

COLUMN 5:

Line 51, "above-descried" should read --above described--.

COLUMN 8:

Line 25, "phenomenon)" should read --phenomenon")--.

COLUMN 9:

Line 7, "$(C_{zb}F_{2xb}-O);$" should read --$(C_{xb}F_{2xb}-O);$--; and
    Line 27, before "$R^1-(A^1)_{ga}-L^1-(A^2)_{ha}-L^2-(A^3)_{ia}-J^1-R^2,$" add $$R^1-\underset{\underset{X^1_{ja}}{|}}{(A^1)_{ga}}-L^1-\underset{\underset{Y^1_{ma}}{|}}{(A^2)_{ha}}-L^2-\underset{\underset{Z^1_{na}}{|}}{(A^3)_{ia}}-J^1-R^2$$

--<u>Formula (II)</u>:--.

UNITED STATES PATENT AND TRADEMARK OFFICE
CERTIFICATE OF CORRECTION

PATENT NO. : 6,001,276

DATED : December 14, 1999

INVENTOR(S) : MASANOBU ASAOKA ET AL.

Page 2 of 3

It is certified that error appears in the above-identified patent and that said Letters Patent is hereby corrected as shown below:

COLUMN 10:

Line 27, before "$R^4-(A^4)_{gb}-L^3-(A^5)_{hb}-L^4-(A^6)_{ib}-J^2-R^5$," with $X^2_{jb}$, $Y^2_{mb}$, $Z^2_{nb}$, add --<u>Formula III</u>):--.

COLUMN 11:

Line 12, "$-CO-O-C_rcH_{2rc}-$," should read ---$CO-O-C_{rc}H_{2rc}-$,---.

COLUMN 35:

Compound III-40, " 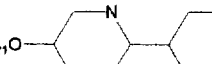 " should read --  --

COLUMN 51:

Line 45, "a" should read --an--.

COLUMN 54:

Line 15, "agron" should read --argon--.

COLUMN 55:

Line 59, "0%" should read --0%.--.

UNITED STATES PATENT AND TRADEMARK OFFICE
CERTIFICATE OF CORRECTION

PATENT NO.   :  6,001,276
DATED        :  December 14, 1999
INVENTOR(S)  :  MASANOBU ASAOKA ET AL.

Page 3 of 3

It is certified that error appears in the above-identified patent and that said Letters Patent is hereby corrected as shown below:

<u>COLUMN 62:</u>

Line 1, "Liquid" should read --liquid--.

Signed and Sealed this

Twenty-ninth Day of August, 2000

Attest:

Attesting Officer

Q. TODD DICKINSON
Director of Patents and Trademarks